(12) United States Patent
Deliz Centeno

(10) Patent No.: US 11,694,658 B2
(45) Date of Patent: Jul. 4, 2023

(54) TRANSFERRING A VIRTUAL OBJECT

(71) Applicant: Apple Inc., Cupertino, CA (US)

(72) Inventor: Luis R. Deliz Centeno, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/191,385

(22) Filed: Mar. 3, 2021

(65) Prior Publication Data

US 2021/0193084 A1 Jun. 24, 2021

Related U.S. Application Data

(63) Continuation of application No. PCT/US2019/052775, filed on Sep. 24, 2019.

(60) Provisional application No. 62/897,027, filed on Sep. 6, 2019, provisional application No. 62/738,383, filed on Sep. 28, 2018.

(51) Int. Cl.
*G09G 5/373* (2006.01)
*G06F 3/01* (2006.01)
*G06T 3/40* (2006.01)
*G09G 5/38* (2006.01)

(52) U.S. Cl.
CPC ............ *G09G 5/373* (2013.01); *G06F 3/013* (2013.01); *G06T 3/40* (2013.01); *G09G 5/38* (2013.01); *G09G 2340/045* (2013.01); *G09G 2340/0464* (2013.01); *G09G 2354/00* (2013.01)

(58) Field of Classification Search
CPC ....... G09G 5/373; G09G 2354/00; G06T 3/40
See application file for complete search history.

(56) References Cited

U.S. PATENT DOCUMENTS

| 8,968,099 B1 | 3/2015 | Hanke et al. |
| 10,484,508 B2 | 11/2019 | Clement et al. |
| 11,049,082 B2 | 6/2021 | Rice |
| 2007/0174333 A1* | 7/2007 | Lee .................... G06F 3/0689 |
| 2011/0055919 A1 | 3/2011 | Hamilton et al. |

(Continued)

OTHER PUBLICATIONS

International Preliminary Report on Patentability received for PCT Patent Application No. PCT/US2019/052775, dated Apr. 8, 2021, 14 pages.

(Continued)

*Primary Examiner* — Samantha (Yuehan) Wang
(74) *Attorney, Agent, or Firm* — DLA Piper LLP (US)

(57) ABSTRACT

In an exemplary process, a virtual object is displayed in an enhanced reality setting. A request to transfer the virtual object is received, wherein a determination is made whether a set of one or more virtual object transfer criteria is satisfied. Movement of the virtual object away from an avatar is displayed in accordance with a determination that the set of one or more virtual object transfer criteria is satisfied. Displaying movement includes determining whether a size of the virtual object satisfies a set of one or more size criteria. In accordance with a determination that the size of the virtual object satisfies the set of one or more size criteria, a reduction in the size of the virtual object is displayed. In accordance with a determination that the size of the virtual object does not satisfy the set of one or more size criteria, displaying of a reduction in the size of the virtual object is foregone.

25 Claims, 37 Drawing Sheets

(56) References Cited

U.S. PATENT DOCUMENTS

| | | | | |
|---|---|---|---|---|
| 2013/0095924 A1* | 4/2013 | Geisner | ............ | G09B 19/0038 |
| | | | | 463/32 |
| 2014/0132629 A1* | 5/2014 | Pandey | ............... | G02B 27/017 |
| | | | | 345/633 |
| 2017/0372516 A1* | 12/2017 | Evans | ................... | G06T 15/20 |

OTHER PUBLICATIONS

International Search Report and Written Opinion received for PCT Patent Application No. PCT/US2019/052775, dated Mar. 3, 2020, 18 pages.

Invitation to Pay Addition Fees received for PCT Patent Application No. PCT/US2019/052775, dated Jan. 7, 2020, 14 pages.

Youtube,"VR Basketball Oculus Touch Sports Game play. TOP 3! 131K fans!", Retrieved from the Internet: URL: https://www.youtube.com/watch?v=PQHLUB0Wh2E, Retrieved on Dec. 12, 2019, Dec. 11, 2016, 3 pages.

\* cited by examiner

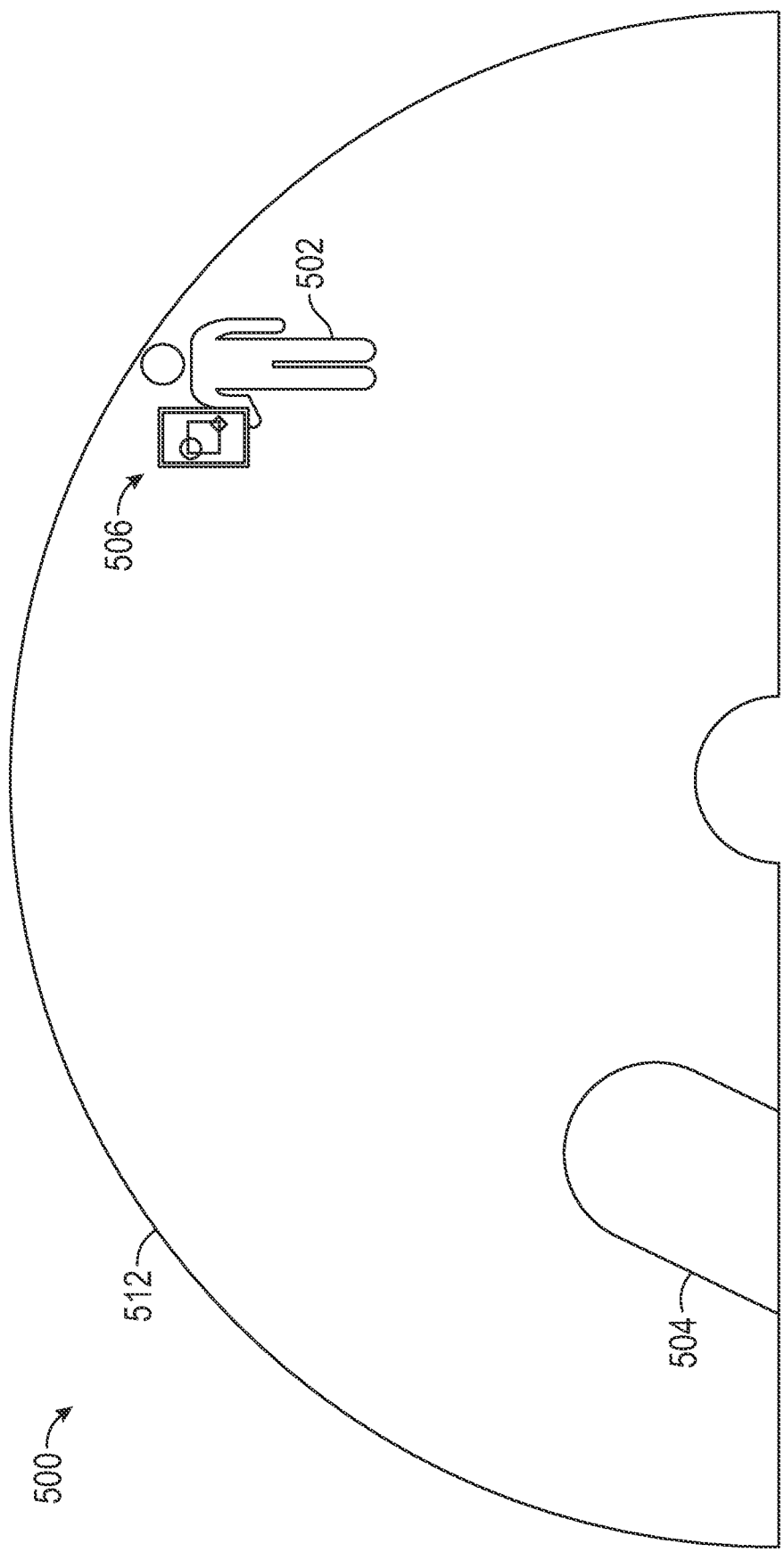

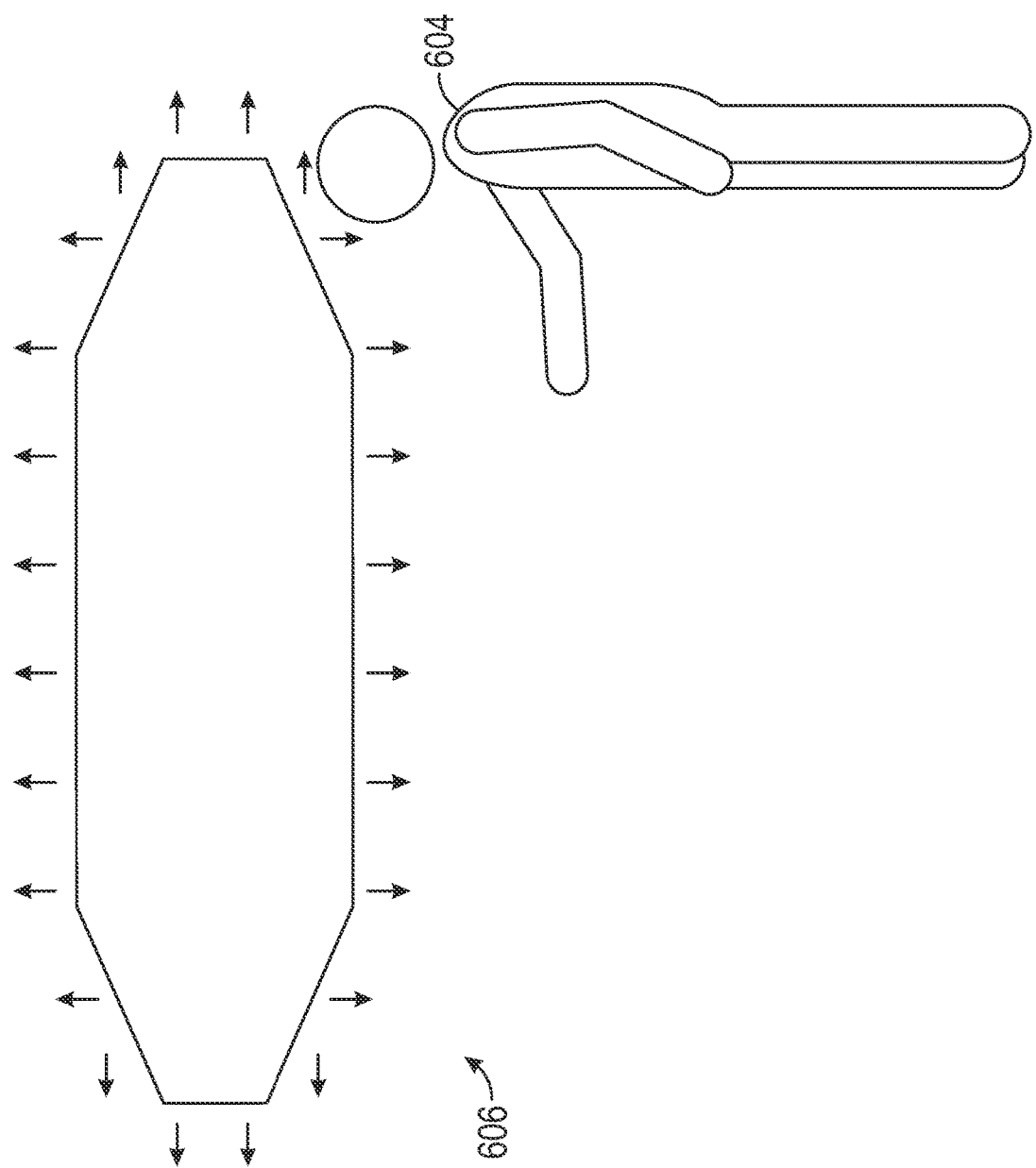

TRANSFERRING A VIRTUAL OBJECT

CROSS REFERENCE TO RELATED APPLICATIONS

This application is a continuation of PCT Application PCT/US2019/052775, entitled "TRANSFERRING A VIRTUAL OBJECT IN AN ENHANCED REALITY SETTING," filed on Sep. 24, 2019, which claims priority to U.S. Provisional Patent Application 62/897,027, entitled "TRANSFERRING A VIRTUAL OBJECT IN AN ENHANCED REALITY SETTING," filed on Sep. 6, 2019, and to U.S. Provisional Patent Application 62/738,383, entitled "TRANSFERRING A VIRTUAL OBJECT IN A VIRTUAL ENVIRONMENT," filed on Sep. 28, 2018, each of which are hereby incorporated by reference in their entirety for all purposes.

BACKGROUND

1. Field

The present disclosure relates generally to enhanced reality, and more specifically to techniques for transferring a virtual object in an enhanced reality setting.

2. Description of Related Art

Conventional enhanced reality environments may include representations of avatars and virtual objects. A user associated with an avatar may interact with the virtual objects in various ways.

BRIEF SUMMARY

The present disclosures describes techniques for transferring a virtual object in an enhanced reality setting. Virtual reality, mixed reality, and augmented reality environments provide a platform to enable users of such systems to interact with each other. For example, a user may control an avatar within the environment in order to interact with another avatar in the environment. These environments further facilitate the transfer of virtual objects between avatars. As these environments continue to become more complex, facilitating a seamless transfer of a virtual object between avatars becomes more difficult. For example, transferring a large virtual object may obstruct the field of view of a user, causing user disorientation and resulting in the interruption of the virtual, augmented, or mixed reality experience. Accordingly, a method and system for transferring a virtual object while providing an optimal user experience is desired.

According to some embodiments, a virtual object is displayed in an enhanced reality setting. A request to transfer the virtual object is received, wherein in accordance with the request, a determination is made whether a set of one or more virtual object transfer criteria is satisfied. In accordance with a determination that the set of one or more virtual object transfer criteria is satisfied, movement of the virtual object away from the avatar is displayed in the enhanced reality setting. Displaying movement of the virtual object includes determining whether a size of the virtual object satisfies a set of one or more size criteria. In accordance with a determination that the size of the virtual object satisfies the set of one or more size criteria, a reduction in the size of the virtual object is displayed. In accordance with a determination that the size of the virtual object does not satisfy the set of one or more size criteria, displaying of a reduction in the size of the virtual object is foregone.

BRIEF DESCRIPTION OF FIGURES

FIGS. 5A-5F depict a transfer of a virtual object in an enhanced reality setting using virtual object size reduction from the perspective of a transferee according to an embodiment.

FIGS. 6A-6G depict a transfer of a virtual object in an enhanced reality setting using virtual object size reduction according to an embodiment.

DESCRIPTION

Figure 1A:
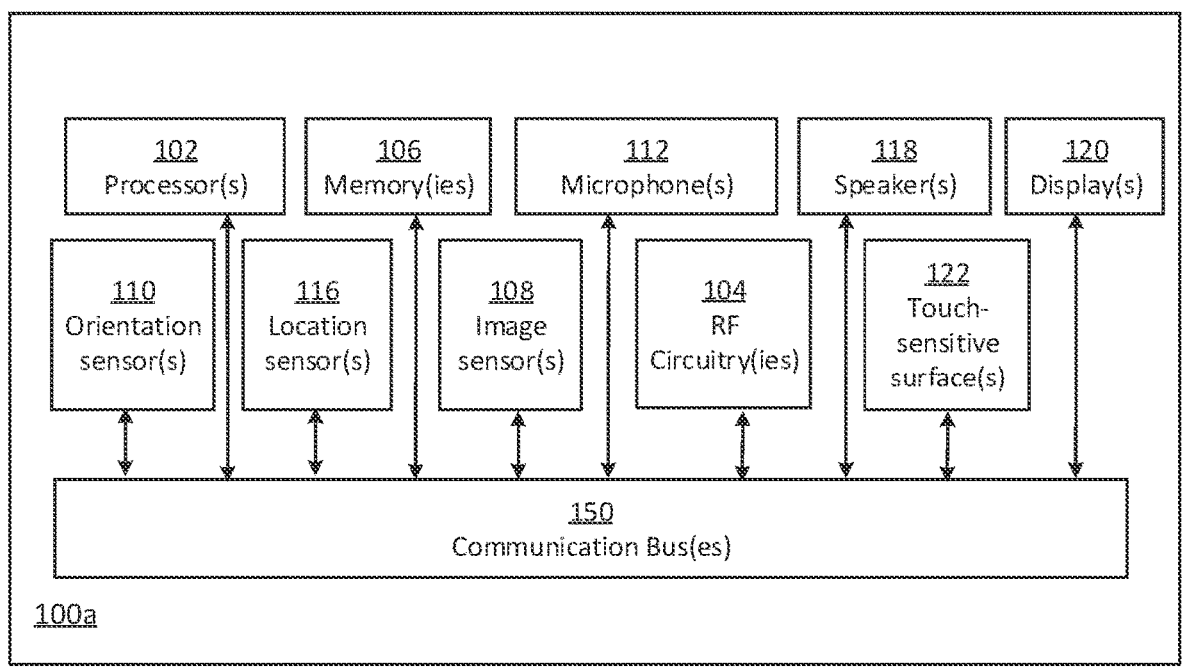
FIGS. 1A-1B depict exemplary systems for use in various computer enhanced reality technologies, including virtual reality and mixed reality.

Various examples of electronic systems and techniques for using such systems in relation to various enhanced reality technologies are described.

A physical setting refers to a world with which various persons can sense and/or interact without use of electronic systems. Physical settings, such as a physical park, include physical elements, such as, for example, physical wildlife, physical trees, and physical plants. Persons can directly sense and/or otherwise interact with the physical setting, for example, using one or more senses including sight, smell, touch, taste, and hearing.

An enhanced reality (ER) setting, in contrast to a physical setting, refers to an entirely (or partly) computer-produced setting that various persons, using an electronic system, can sense and/or otherwise interact with. In ER, a person's movements are in part monitored, and, responsive thereto, at least one attribute corresponding to at least one virtual object in the ER setting is changed in a manner that is consistent with one or more physical laws. For example, in response to an ER system detecting a person looking upward, the ER system may adjust various audio and graphics presented to the person in a manner consistent with how such sounds and appearances would change in a physical setting. Adjustments to attribute(s) of virtual object(s) in an ER setting also may be made, for example, in response to representations of movement (e.g., voice commands).

A person may sense and/or interact with an ER object using one or more senses, such as sight, smell, taste, touch, and sound. For example, a person may sense and/or interact with objects that create a multi-dimensional or spatial acoustic setting. Multi-dimensional or spatial acoustic settings provide a person with a perception of discrete acoustic sources in multi-dimensional space. Such objects may also enable acoustic transparency, which may selectively incorporate audio from a physical setting, either with or without computer-produced audio. In some ER settings, a person may sense and/or interact with only acoustic objects.

Virtual reality (VR) is one example of ER. A VR setting refers to an enhanced setting that is configured to only include computer-produced sensory inputs for one or more senses. A VR setting includes a plurality of virtual objects that a person may sense and/or interact with. A person may sense and/or interact with virtual objects in the VR setting through a simulation of at least some of the person's actions within the computer-produced setting, and/or through a simulation of the person or her presence within the computer-produced setting.

Mixed reality (MR) is another example of ER. An MR setting refers to an enhanced setting that is configured to integrate computer-produced sensory inputs (e.g., virtual objects) with sensory inputs from the physical setting, or a representation of sensory inputs from the physical setting. On a reality spectrum, an MR setting is between, but does not include, a completely physical setting at one end and a VR setting at the other end.

In some MR settings, computer-produced sensory inputs may be adjusted based on changes to sensory inputs from the physical setting. Moreover, some electronic systems for presenting MR settings may detect location and/or orientation with respect to the physical setting to enable interaction between real objects (i.e., physical elements from the physical setting or representations thereof) and virtual objects. For example, a system may detect movements and adjust computer-produced sensory inputs accordingly, so that, for example, a virtual tree appears fixed with respect to a physical structure.

Augmented reality (AR) is an example of MR. An AR setting refers to an enhanced setting where one or more virtual objects are superimposed over a physical setting (or representation thereof). As an example, an electronic system may include an opaque display and one or more imaging sensors for capturing video and/or images of a physical setting. Such video and/or images may be representations of the physical setting, for example. The video and/or images are combined with virtual objects, wherein the combination is then displayed on the opaque display. The physical setting may be viewed by a person, indirectly, via the images and/or video of the physical setting. The person may thus observe the virtual objects superimposed over the physical setting. When a system captures images of a physical setting, and displays an AR setting on an opaque display using the captured images, the displayed images are called a video pass-through. Alternatively, a transparent or semi-transparent display may be included in an electronic system for displaying an AR setting, such that an individual may view the physical setting directly through the transparent or semi-transparent displays. Virtual objects may be displayed on the semi-transparent or transparent display, such that an individual observes virtual objects superimposed over a physical setting. In yet another example, a projection system may be utilized in order to project virtual objects onto a physical setting. For example, virtual objects may be projected on a physical surface, or as a holograph, such that an individual observes the virtual objects superimposed over the physical setting.

An AR setting also may refer to an enhanced setting in which a representation of a physical setting is modified by computer-produced sensory data. As an example, at least a portion of a representation of a physical setting may be graphically modified (e.g., enlarged), so that the modified portion is still representative of (although not a fully-reproduced version of) the originally captured image(s). Alternatively, in providing video pass-through, one or more sensor images may be modified in order to impose a specific viewpoint different than a viewpoint captured by the image sensor(s). As another example, portions of a representation of a physical setting may be altered by graphically obscuring or excluding the portions.

Augmented virtuality (AV) is another example of MR. An AV setting refers to an enhanced setting in which a virtual or computer-produced setting integrates one or more sensory inputs from a physical setting. Such sensory input(s) may include representations of one or more characteristics of a physical setting. A virtual object may, for example, incorporate a color associated with a physical element captured by imaging sensor(s). Alternatively, a virtual object may adopt characteristics consistent with, for example, current weather conditions corresponding to a physical setting, such as weather conditions identified via imaging, online weather information, and/or weather-related sensors. As another example, an AR park may include virtual structures, plants, and trees, although animals within the AR park setting may include features accurately reproduced from images of physical animals.

Various systems allow persons to sense and/or interact with ER settings. For example, a head mounted system may include one or more speakers and an opaque display. As another example, an external display (e.g., a smartphone) may be incorporated within a head mounted system. The head mounted system may include microphones for capturing audio of a physical setting, and/or image sensors for capturing images/video of the physical setting. A transparent or semi-transparent display may also be included in the head mounted system. The semi-transparent or transparent display may, for example, include a substrate through which light (representative of images) is directed to a person's eyes. The display may also incorporate LEDs, OLEDs, liquid crystal on silicon, a laser scanning light source, a digital light projector, or any combination thereof. The substrate through which light is transmitted may be an optical reflector, holographic substrate, light waveguide, optical combiner, or any combination thereof. The transparent or semi-transparent display may, for example, transition selectively between a transparent/semi-transparent state and an opaque state. As another example, the electronic system may be a projection-based system. In a projection-based system, retinal projection may be used to project images onto a person's retina. Alternatively, a projection-based system also may project virtual objects into a physical setting, for example, such as projecting virtual objects as a holograph or onto a physical surface. Other examples of ER systems include windows configured to display graphics, headphones, earphones, speaker arrangements, lenses configured to display graphics, heads up displays, automotive windshields configured to display graphics, input mechanisms (e.g., controllers with or without haptic functionality), desktop or laptop computers, tablets, or smartphones.

Figure 1B:
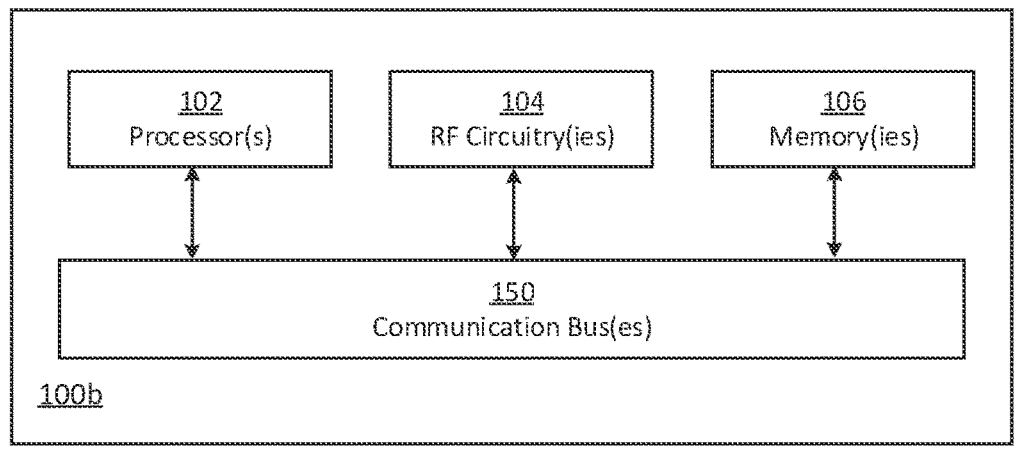
Figure 1B:
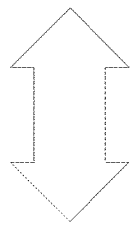
Figure 1B:
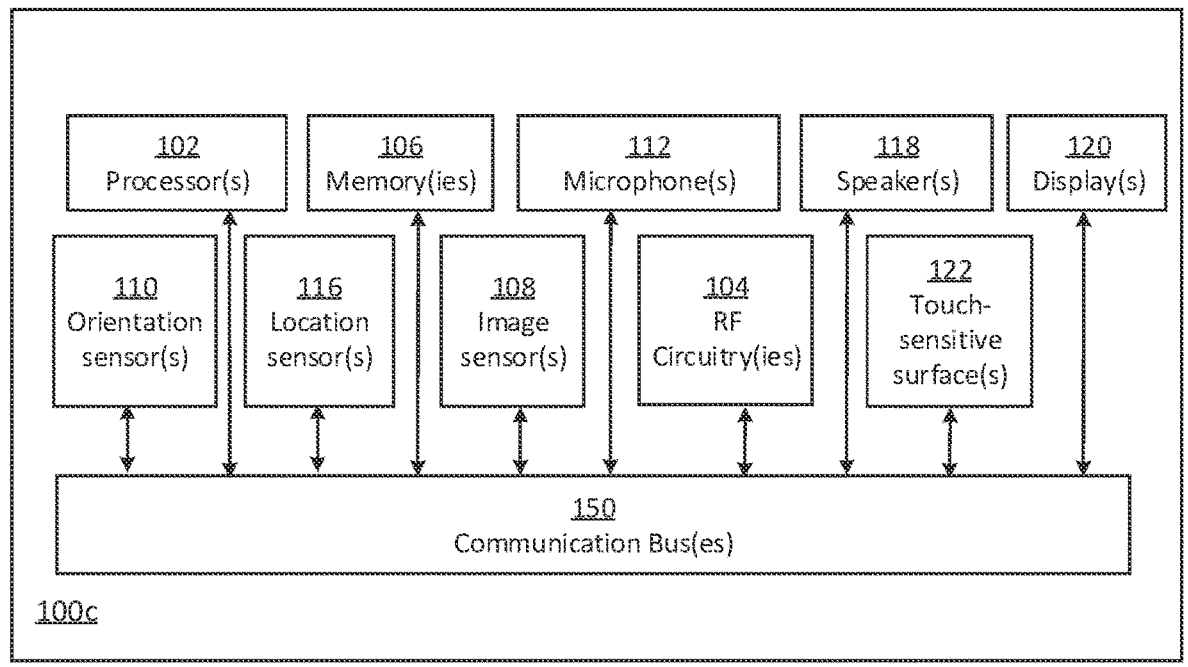

FIG. 1A and FIG. 1B depict exemplary system 100 for use in various enhanced reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of system 100 are implemented in a second device (e.g., a head-mounted device). In some examples, device 100a is implemented in a base station device or a second device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

With reference now to FIGS. 2A-8, exemplary techniques for transferring a virtual object in an enhanced reality setting are described.

Figure 2A:
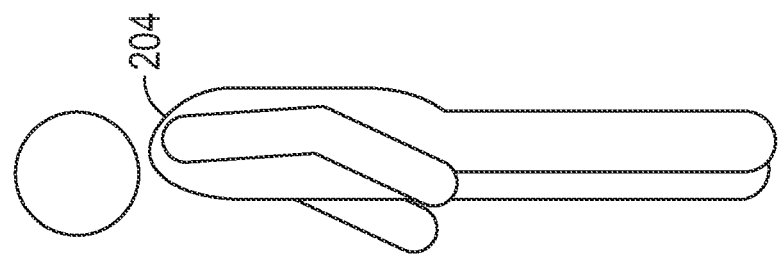
FIGS. 2A-2D depict an exemplary transfer of a virtual object in an enhanced reality setting according to an embodiment.
Figure 2A:
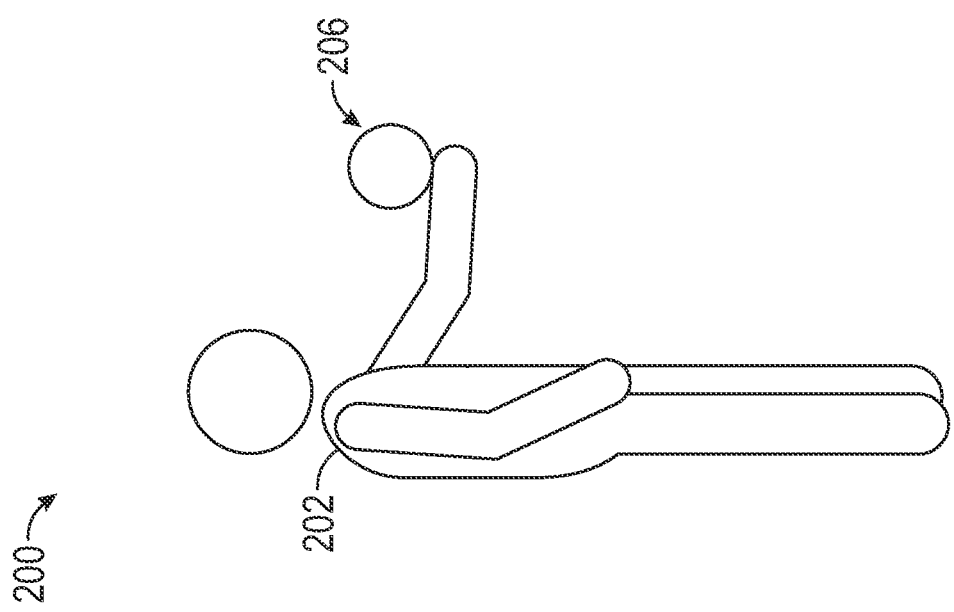

FIGS. 2A-2D depict an exemplary transfer of a virtual object in an enhanced reality setting 200 according to an embodiment. Enhanced reality setting 200 may include a first avatar 202 and a second avatar 204, as shown in FIG. 2A. First avatar 202 may correspond to an avatar associated with a first user, and second avatar 204 may correspond to an avatar associated with a second user. In some embodiments, the first avatar 202 may be controlled by the first user and the second avatar 204 may be controlled by the second user.

In some embodiments, first avatar 202 is associated with a virtual object 206. The virtual object 206 may follow movement of the first avatar 202. For example, a virtual object following movement of an avatar may include the virtual object displayed as being controlled by an avatar. In some embodiments, a virtual object following movement of an avatar includes the virtual object displayed as being held by one or more hands of the avatar, or being displayed proximate to the one or more hands of the avatar. In some embodiments, a virtual object following movement of an avatar may include the virtual object being displayed as proximate to an avatar, such as above the avatar, in front of the avatar, behind the avatar, or any other location proximate to the avatar.

In some embodiments, the virtual object 206 is transferred between avatars. A user associated with the first avatar 202, for instance, may request transfer of virtual object 206. By way of example, requesting transfer of virtual object 206 may include activating virtual object 206. Requesting transfer of virtual object 206 may include requesting transfer of the virtual object 206 to another avatar or another location. For example, with reference to FIG. 2B, the virtual object 206 may be transferred from the first avatar 202 to the second avatar 204. The avatar intended to receive the virtual object may be referred to as a transferee avatar, and the avatar of which the virtual object initially follows movement may be referred to as a transferor avatar. In some embodiments, transfer of a virtual object may be requested by the transferee avatar. For example, if a user associated with an avatar wishes to obtain a virtual object currently following movement of another avatar, the user may request transfer of the object in order to obtain the object.

In some embodiments, the first user (associated with avatar 202) may activate virtual object 206 based on one or more techniques such as gaze direction, gaze depth, one or more button presses on a controller, hand gesture, or any combination thereof. For example, a user may utilize a controller configured to receive inputs via a button, scroll wheel, knob, keyboard, trigger, joystick, or other touch-sensitive surface (e.g., a touchpad or touch-sensitive display). In some embodiments, a controller may be connected via wireless or wired connection. A controller input may include a press of a button, a rotation of a scroll wheel, a rotation of a knob, a press of a button on a keyboard, a contact or gesture (e.g., tap or swipe) on a touch-sensitive surface, a pull of a trigger, or a movement of a joystick, for example.

In some embodiments, activating virtual object 206 includes applying focus on virtual object 206. In some embodiments, an indication is provided to indicate that virtual object 206 has been activated. The indication may include an audio output (e.g., a beep), a visual indication (e.g., outlining or highlighting the activated virtual object), and/or haptic output. Optionally, virtual object 206 remains activated for a predetermined amount of time (e.g., focus is maintained on virtual object 206 for the predetermined amount of time) after which the virtual object is no longer activated. Virtual object 206 may remain activated until a deactivation input is received. In some embodiments, the deactivation input is the same input as the input corresponding to the activation of virtual object 206. In some embodiments, the deactivation input is a different input than the input corresponding to the activation of virtual object 206. The deactivation input may further includes an eye gesture, a body gesture, a voice input, a controller input, or any combination thereof.

In some embodiments, a set of one or more virtual object transfer criteria must be satisfied in order to transfer a virtual object, such as virtual object 206. For example, in order to transfer the virtual object 206 from the first avatar 202 to the second avatar 204, a set of one or more virtual object transfer criteria must be satisfied, such as a set of one or more criteria related to avatar rank, user acceptance parameters, and/or virtual object permissions. An avatar rank may correspond to one or more parameters indicating a relative status among different avatars within the enhanced reality setting. For example, when determining whether a set of one or more virtual object transfer criteria is satisfied based on avatar rank, one or more avatar ranks may be compared prior to requesting transfer. Avatar rank comparison may include determining whether the avatar requesting transfer has an avatar rank which is greater than and/or equal to the avatar intended to receive the virtual object. Avatar ranks may include predefined ranks, such as ranks based on user attributes, recent user activities, or ranks which are temporarily adjusted.

In some embodiments, determining whether a set of one or more virtual object transfer criteria is satisfied may include verifying user acceptance parameters. User acceptance parameters may include parameters set by one or more users associated with one or more avatars of the enhanced reality setting. In the case of a transfer requested by a transferor avatar, for example, a user associated with a corresponding transferee avatar may set parameters to automatically accept or reject transfer of virtual objects of a specific type, virtual objects satisfying a specific object value, and/or virtual objects having specific object attributes. For instance, a transferee avatar may set parameters to automatically accept items having a high currency value (e.g., environment-specific currency or real world currency), and/or may set parameters to automatically reject items of a specific type, such as items that are not appropriate for specific users (e.g., children). In the case of a transfer requested by a transferee avatar, for example, a user associated with a corresponding transferor avatar may set parameters to automatically release or prevent release of virtual objects of a specific type, virtual objects satisfying a specific object value, and/or virtual objects having specific object attributes.

In some embodiments, determining whether a set of one or more virtual object transfer criteria is satisfied may include verifying virtual object permissions. Virtual object permissions may include parameters indicating whether an avatar is permitted to transfer or permitted to receive a particular virtual object. For example, a virtual object permission may include a parameter indicating the virtual object is owned by an avatar, and may further indicate that all other avatars may not request transfer of the virtual object or may not otherwise control the virtual object. As another example, a virtual object permission may include a parameter indicating that the virtual object is a "neutral" object. A "neutral" object may be a virtual object that is not owned by any avatar, and may further indicate that any avatar may request transfer of the virtual object or may control the virtual object. For instance, a transferor avatar may be in control of a virtual object, although may not own the virtual object. In this case, a transferee avatar may request transfer of the "neutral" object from the transferor avatar.

Figure 2B:
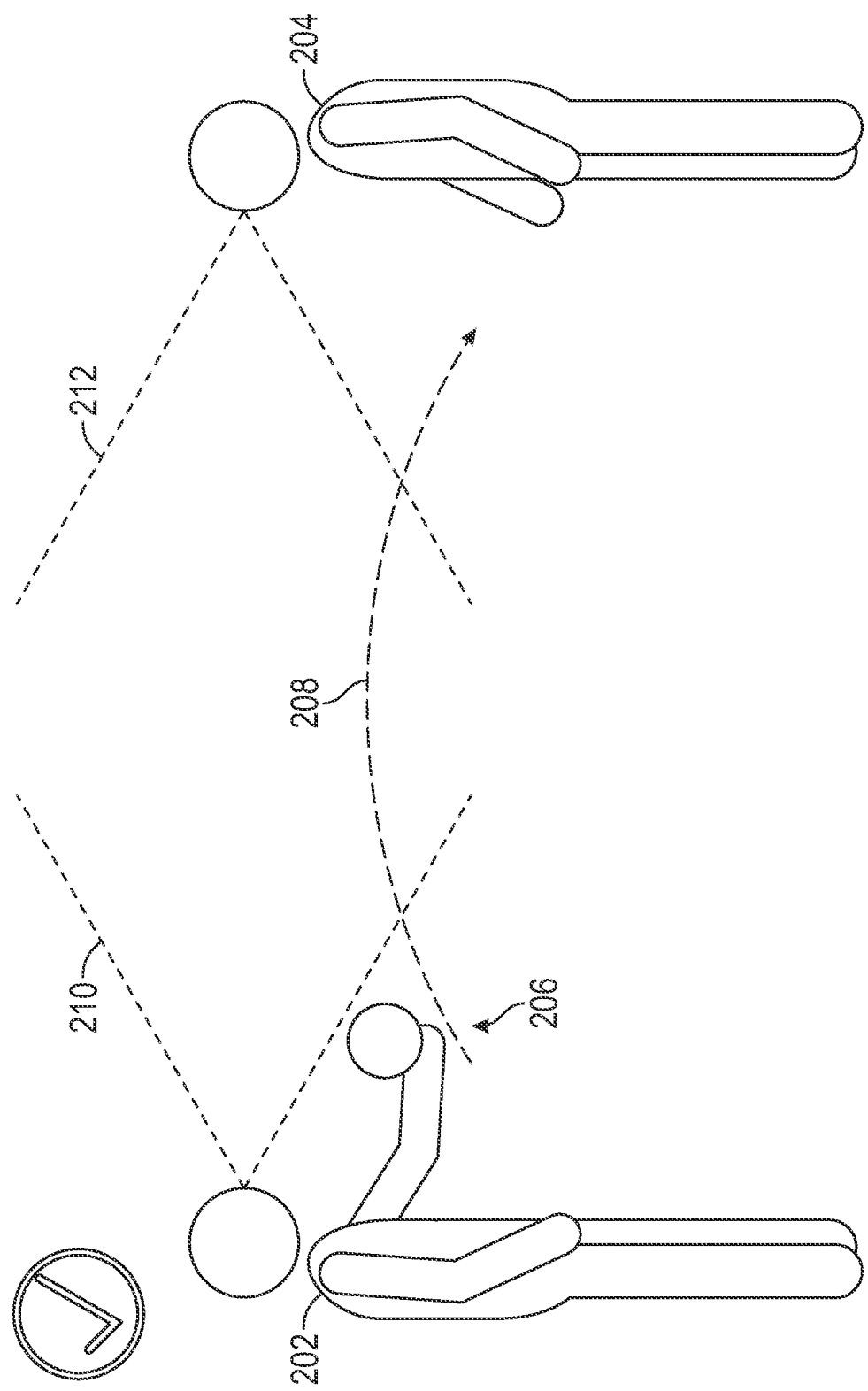

With reference to FIG. 2B, the virtual object 206 may be transferred from first avatar 202 to second avatar 204. Transferring the virtual object between avatars may include displaying movement, such as movement 208, of the virtual object away from a transferor avatar and towards a transferee avatar. In some embodiments, displaying movement of the virtual object may include determining whether to display a reduction in the size of the virtual object so as to avoid obstruction of one or more fields of view, as described in further detail herein. For example, a reduction in the size of the virtual object may be displayed so as to avoid obstruction of field of view 210 and/or field of view 212. Field of view 210 may correspond to the view of a first user associated with first avatar 202. Field of view 212 may correspond to the view of a second user associated with second avatar 204.

Determining whether to display a reduction in the size of the virtual object may include determining whether a size of the virtual object satisfies a set of one or more size criteria, as described further with respect to FIGS. 3A-7G. For example, determining whether a size of the virtual object 206 satisfies a set of one or more size criteria may include determining whether movement of virtual object 206 along path 208 obstructs either field of view 210 or field of view 212.

As used in herein, reducing the size of a virtual object refers to reducing the apparent or perceived size of the virtual object. As an example, displaying movement of a virtual object may include forgoing reducing the size of the virtual object, and displaying the virtual object as moving away from an avatar associated with a user's field of view. In this example, analogous to that of an object moving away from a user in reality, displaying movement of the virtual object without size reduction may still result in the virtual object appearing smaller to a user as the object moves further away from the avatar associated with the user. As another example, displaying movement of a virtual object may include reducing the size of the virtual object, and displaying the virtual object as moving towards an avatar associated with a field of view of the user. In this example, in contrast to that of an object moving towards a user in reality, displaying movement of the virtual object with size reduction may result in the virtual object appearing smaller to a user even though the object is moving towards the avatar associated with the user.

Figure 2C:
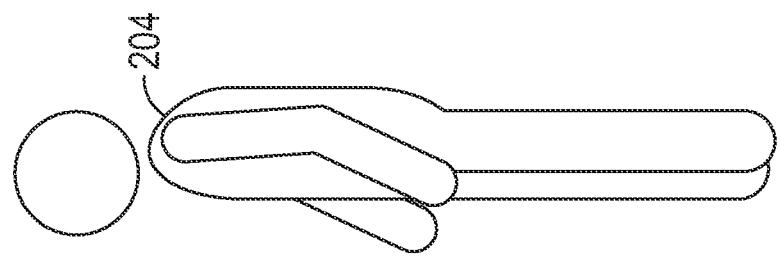
Figure 2C:
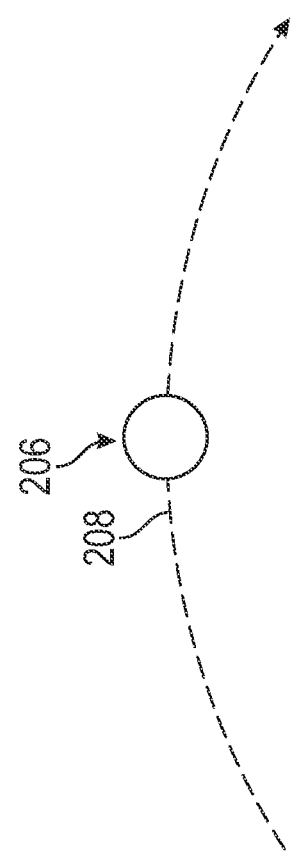
Figure 2C:
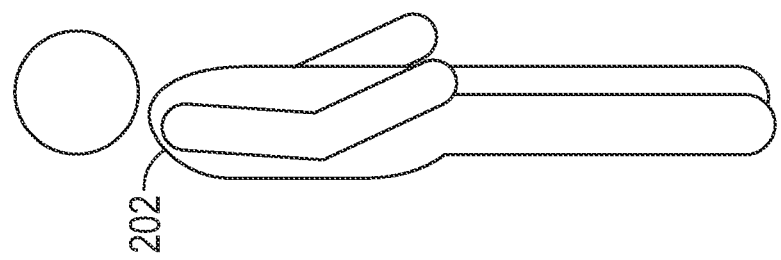
Figure 2D:
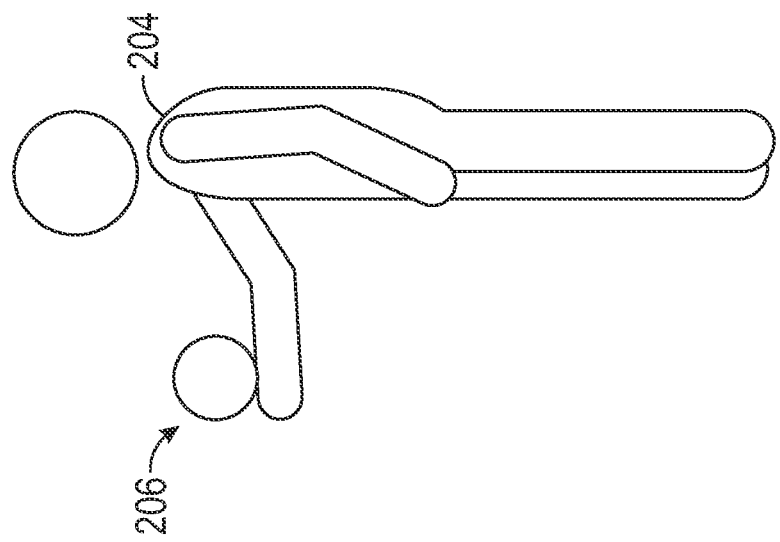
Figure 2D:
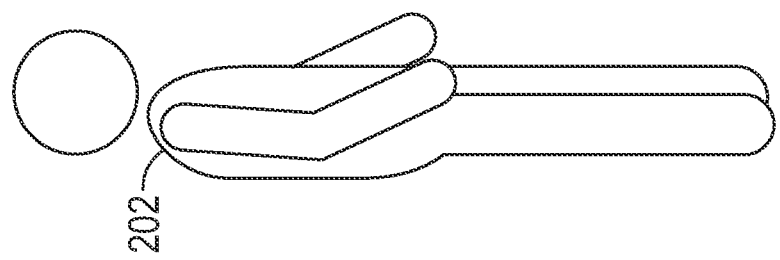

In accordance with a determination that a field of view (such as field of view 210 or field of view 212) is not obstructed, movement of the virtual object 206 is displayed without reducing the size of virtual object 206. For example, the apparent size of the virtual object is maintained as the virtual object moves along path 208. Referring to FIG. 2C, movement 208 of virtual object 206 may be displayed by depicting virtual object 206 moving away from first avatar 202 and toward second avatar 204. Referring to FIG. 2D, completion of the transfer of virtual object 206 from first avatar 202 to second avatar 204 may be depicted by displaying virtual object 206 as proximate to second avatar 204. Thereafter, the virtual object 206 is displayed as following movement of the second avatar 204, such as being controlled by the second avatar 204, for example. In some embodiments, virtual object 206 following movement of the second avatar 204 includes the virtual object 206 displayed as being held by one or more hands of the second avatar 204, or being displayed proximate to the one or more hands of the second avatar 204. Virtual object 206 following movement of second avatar 202 may include the virtual object 206 being displayed within one or more hands of the second avatar 204, or otherwise being displayed proximate to the one or more hands of the second avatar 204.

Figure 3A:
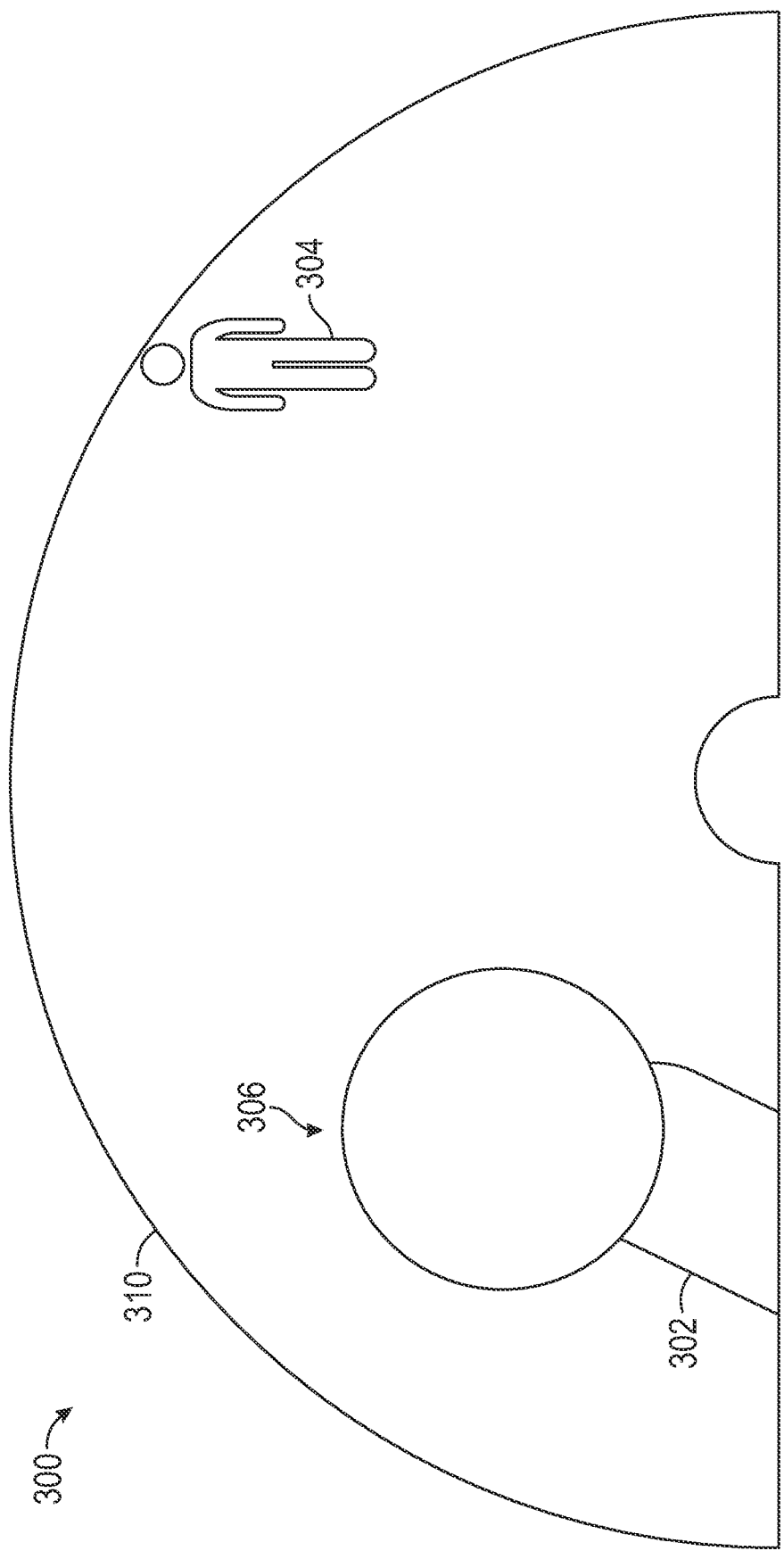
FIGS. 3A-3D depict a transfer of a virtual object in an enhanced reality setting from the perspective of a transferor according to an embodiment.

FIGS. 3A-3D depict a transfer of a virtual object in an enhanced reality setting 300 from the perspective of a transferor according to an embodiment. The virtual object transfer depicted in FIGS. 3A-3D may correspond to the virtual object transfer depicted in FIGS. 2A-2D. Referring to FIG. 3A, a user perspective is depicted, including a field of view 310 of a user. Field of view 310 may correspond to the view of a user associated with a transferor avatar, such as a view of enhanced reality setting 300. For example, at least a portion of a first avatar 302 is displayed within field of view 310, such as a hand of a first avatar 302. A second avatar 304 is displayed, within field of view 310, at a distance from the first avatar 302. First avatar 302 may be associated with a virtual object 306, such that virtual object 306 follows movement of the first avatar 302.

Figure 3B:
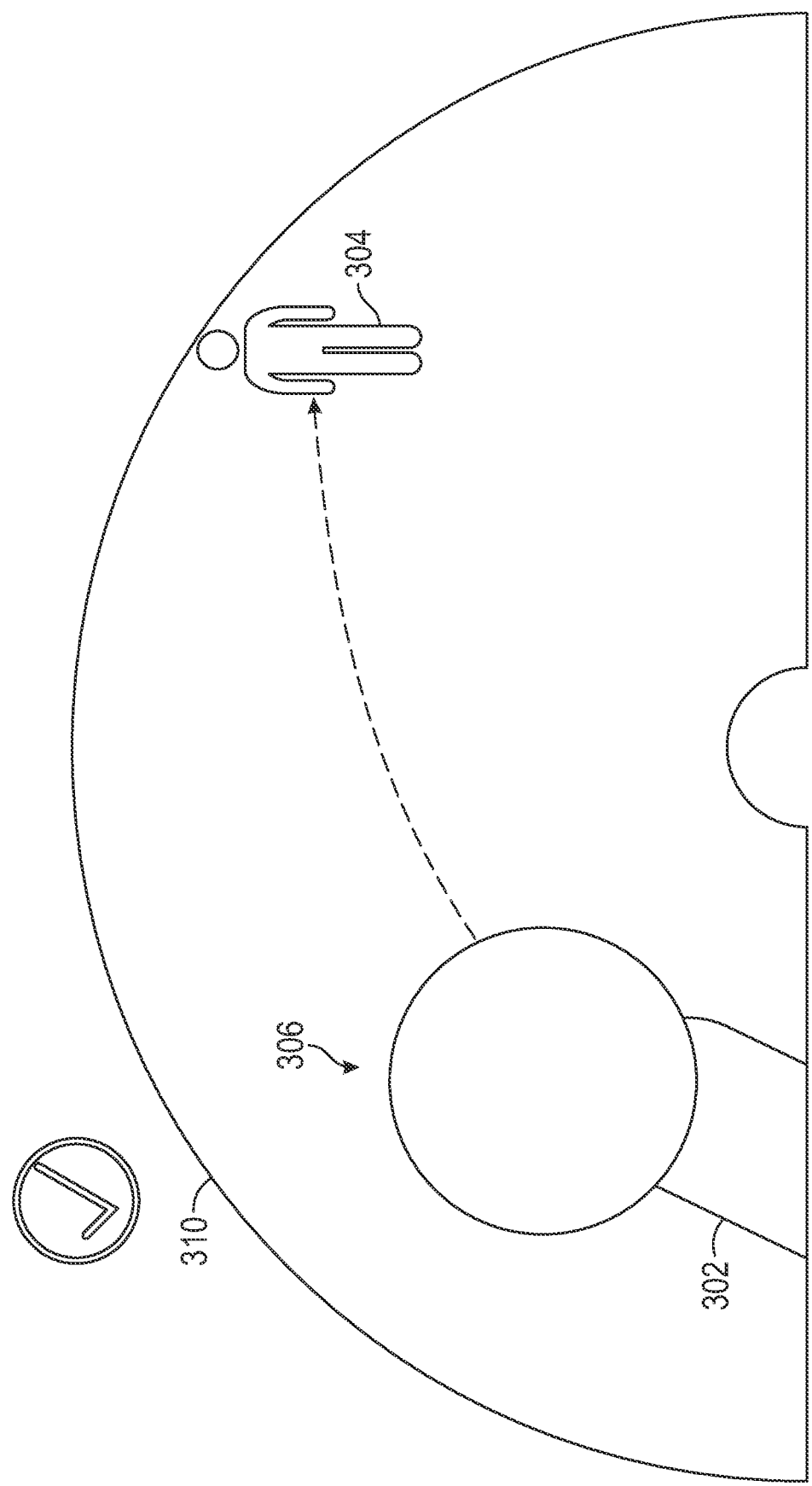

Referring to FIG. 3B, a first user associated with first avatar 302 may request a transfer of virtual object 306. The request to transfer virtual object 306 may cause display of one or more outputs to indicate the request to transfer the virtual object 306. For example, visual feedback within the enhanced reality setting may be displayed (not depicted), for instance proximate to the virtual object 306, in order to indicate that first avatar 302 is requesting transfer of the virtual object 306. In some embodiments, visual feedback 314 may be visible within field of view 310 of the user associated with first avatar 302, a field of view of a user associated with second avatar 304, and/or any fields of view of users associated with other avatars within the enhanced reality setting. Other types of feedback may be output to indicate the request to transfer the virtual object. Such feedback may be output instead of or in addition to visual feedback. For example, audible feedback may be output through one or more speakers, such as speaker(s) 118. As another example, haptic feedback may be provided, such as one or more vibrations on a wearable HUD device, one or more handheld devices of a user, and the like.

Figure 3C:
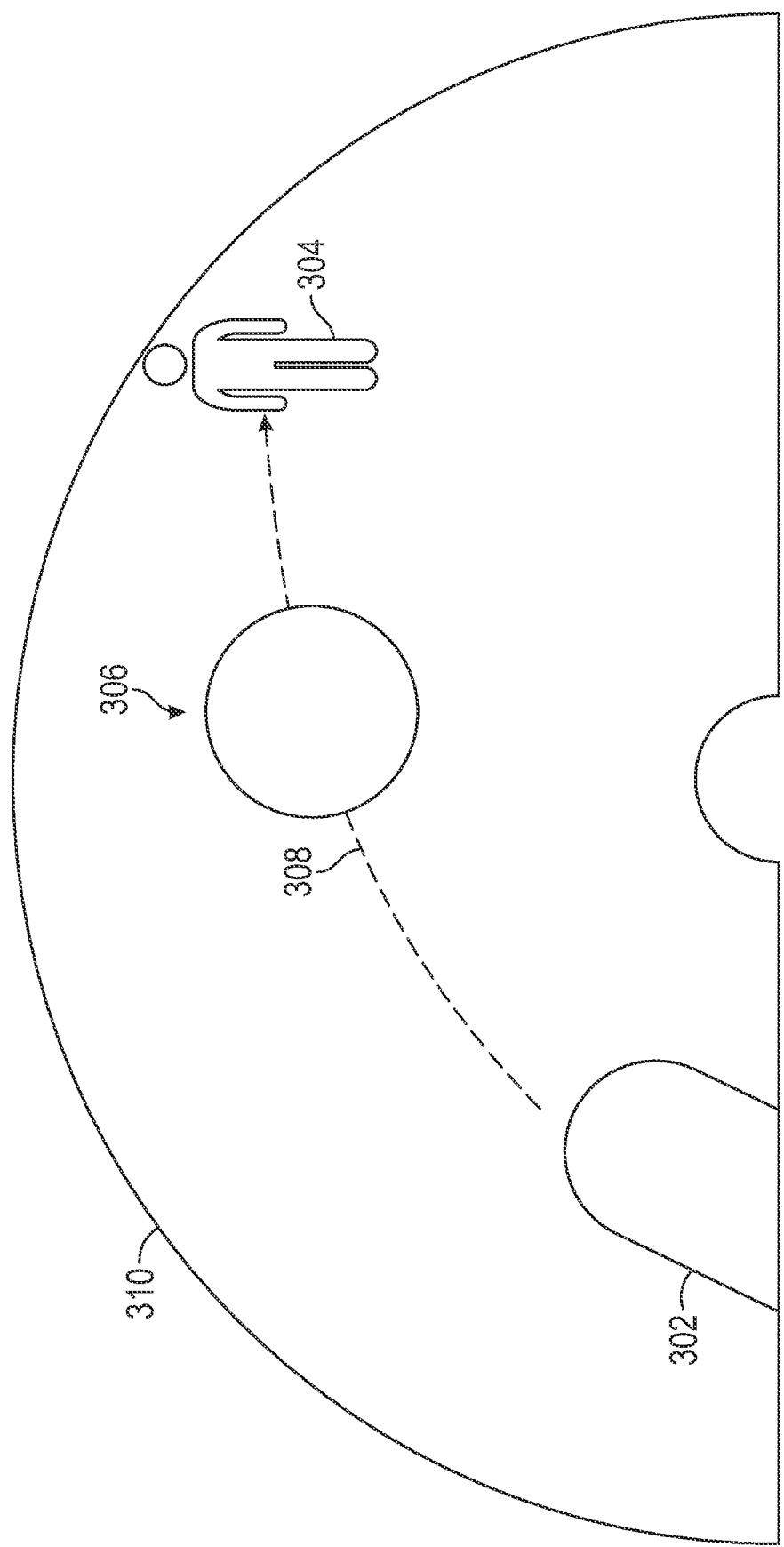

Referring to FIG. 3C, after the transfer has been requested, movement of virtual object 306 may be displayed, for example, in accordance with a determination that a set of one or more virtual object transfer criteria is satisfied. Virtual object 306 may be displayed as moving along path 308 within field of view 310. For example, virtual object 306 may be displayed as moving away from first avatar 302 and towards second avatar 304 along path 308. In some embodiments, displaying movement of the virtual object may include determining whether to display a reduction in the size of the virtual object so as to avoid obstruction of one or more fields of view. For example, a reduction in the size of the virtual object may be displayed so as to avoid obstruction of field of view 310 associated with first avatar 302, and/or a field of view associated with second avatar 304. In the event that neither field of view 310 nor field of view 312 is obstructed, movement of the virtual object is displayed without reducing the size of the virtual object.

In some embodiments, a speed of movement of virtual object 306 may be based on one or more attributes associated with virtual object 306. For example, a virtual object of a larger size may be associated with a slower speed of movement. A virtual object of a smaller size may be associated with a faster speed of movement. In some embodiments, displaying movement of the virtual object may include displaying an immediate transfer from first avatar 302 to second avatar 304, such that no movement is displayed along path 308. For example, an immediate transfer of virtual object 306 between avatars may be displayed within two frames of animation, such that the first frame of animation displays the virtual object proximate to first avatar 302, and the second frame of animation displays the virtual object proximate to second avatar 304.

Figure 3D:
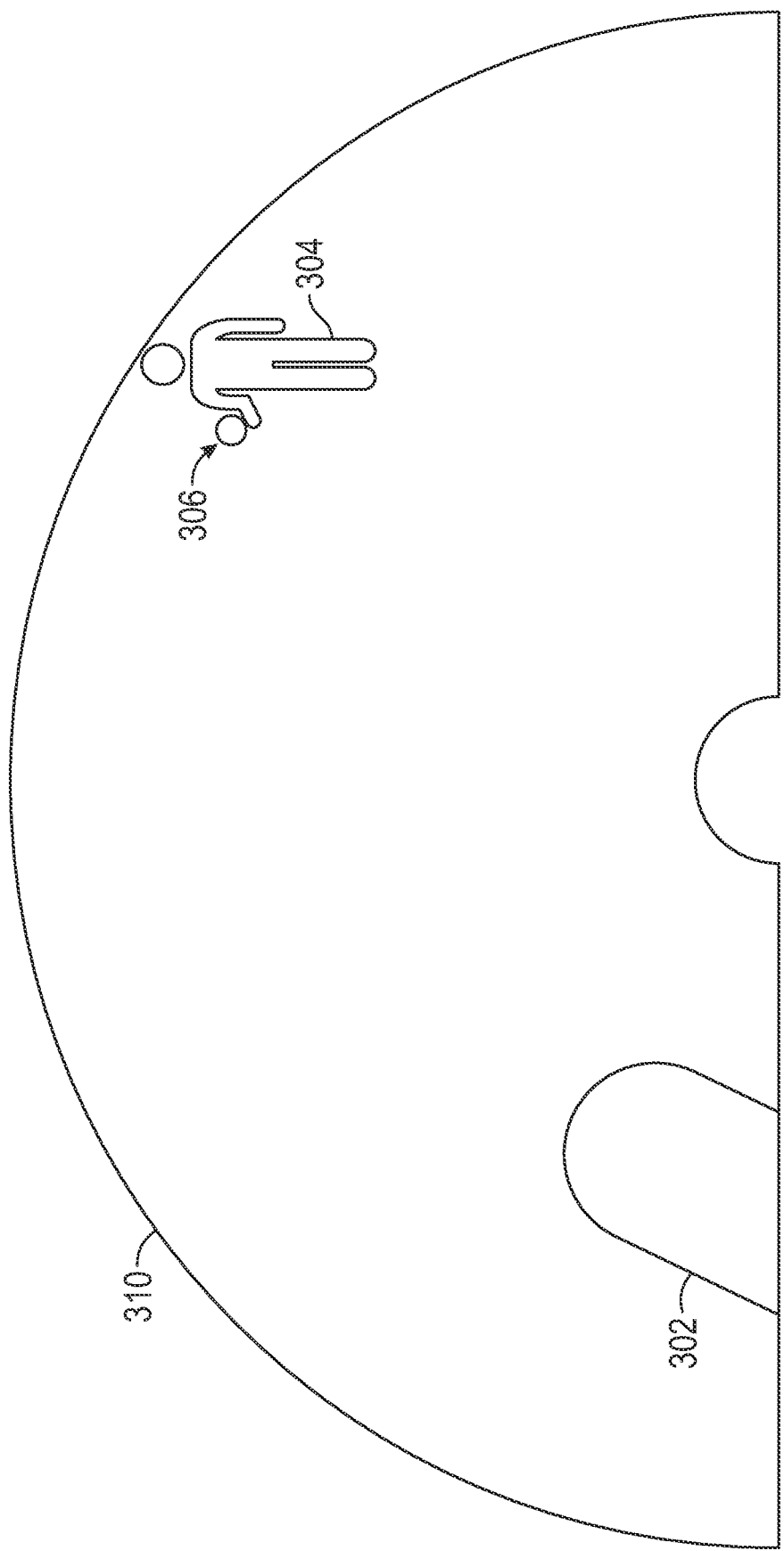

Referring to FIG. 3D, completion of the transfer of virtual object 306 from first avatar 302 to second avatar 304 may be depicted within field of view 310 by displaying virtual object 306 as following movement of second avatar 304. For example, virtual object 306 following movement of second avatar 304 may include virtual object 306 displayed as being controlled by second avatar 304. In some embodiments, virtual object 306 following movement of second avatar 304 may include the virtual object 306 being displayed as proximate to second avatar 304, such as above second avatar 304, in front of second avatar 304, behind second avatar 304, or any other location proximate to second avatar 304.

Figure 4A:
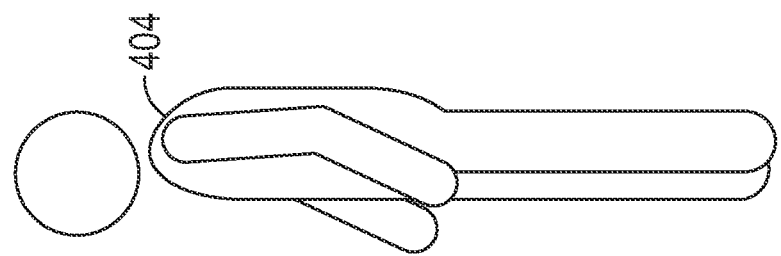
FIGS. 4A-4F depict a transfer of a virtual object in an enhanced reality setting using virtual object size reduction according to an embodiment.
Figure 4A:
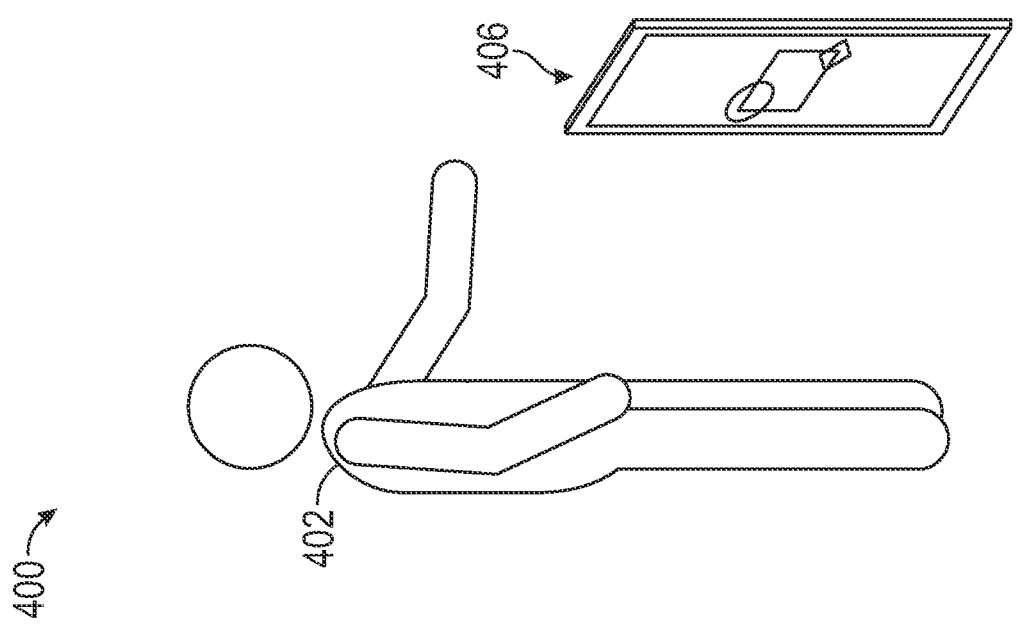
Figure 4B:
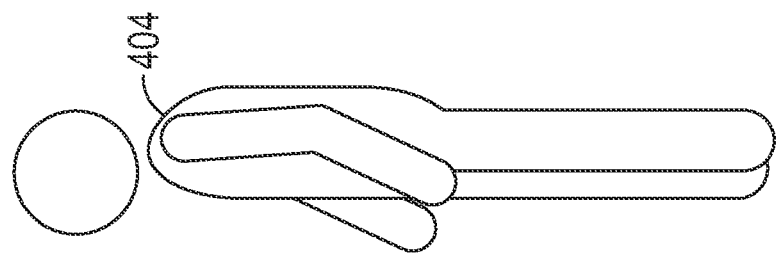
Figure 4B:
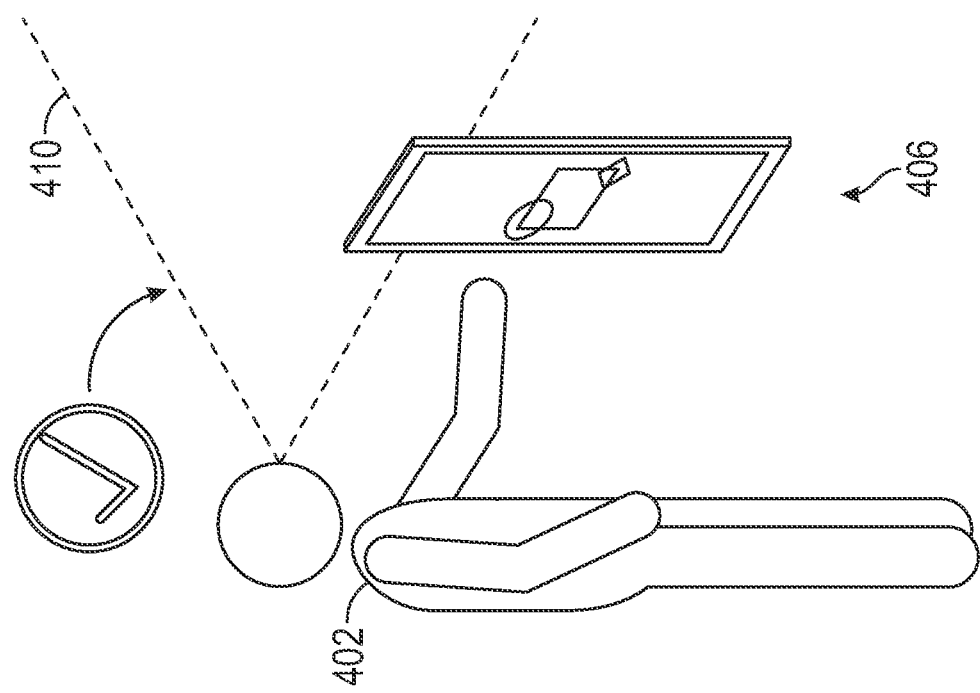

FIGS. 4A-4F depict a transfer of a virtual object in an enhanced reality setting 400 using virtual object size reduction according to an embodiment. Enhanced reality setting 400 may include a first avatar 402, a second avatar 404, and a virtual object 406. As shown in FIG. 4A, virtual object 406 may initially not follow movement of any avatar, such that the virtual object 406 is not being controlled by any avatar. For example, virtual object 406 may initially not follow movement of either first avatar 402 or second avatar 404. Referring now to FIG. 4B, first avatar 402 may activate virtual object 406. For example, a first user associated with first avatar 402 may interact with one or more inputs in order to cause first avatar 402 to activate virtual object 406. Activation of virtual object 406 may include controlling virtual object 406, such that virtual object 406 follows movement of first avatar 402. Activation of virtual object 406 may be facilitated by a user associated with first avatar 402, for example, by the user performing one or more techniques such as gaze direction, gaze depth, one or more button presses on a controller, hand gesture, or a combination thereof.

Field of view 410 may correspond to the view of a first user associated with first avatar 402. Upon activation of virtual object 406 by first avatar 402, virtual object 406 may be displayed as moving toward first avatar 402. Displaying movement of virtual object 406 towards first avatar 402 may include determining whether to reduce the size of the virtual object so as to avoid obstruction of field of view 410 associated with first avatar 402, as discussed in more detail with respect to FIGS. 6A-7G. For example, a determination is made whether a size of virtual object 406 satisfies a set of one or more size criteria in order to determine whether to display a reduction in the size of virtual object 406. In some embodiments, determining whether to display a reduction in the size of a virtual object is performed so as to avoid obstruction of field of view 410 associated with first avatar 402. In accordance with a determination that a size of virtual object 406 does not satisfy the set of one or more size criteria, a reduction in the size of the virtual object 406 may be foregone.

In response to virtual object 406 being displayed as moving toward first avatar 402, virtual object 406 may be displayed as following movement of first avatar 402. For example, virtual object 406 displayed as following movement of first avatar 402 may include virtual object 406 displayed as being controlled by first avatar 402. In some embodiments, virtual object 406 displayed as following movement of first avatar 402 may include virtual object 406 displayed as proximate to first avatar 402 as discussed herein. Once virtual object 406 follows movement of first avatar 402, a request to transfer virtual object 406 may be received. For example, a user associated with first avatar 402 may request transfer of virtual object 406 to second avatar 404.

Figure 4C:
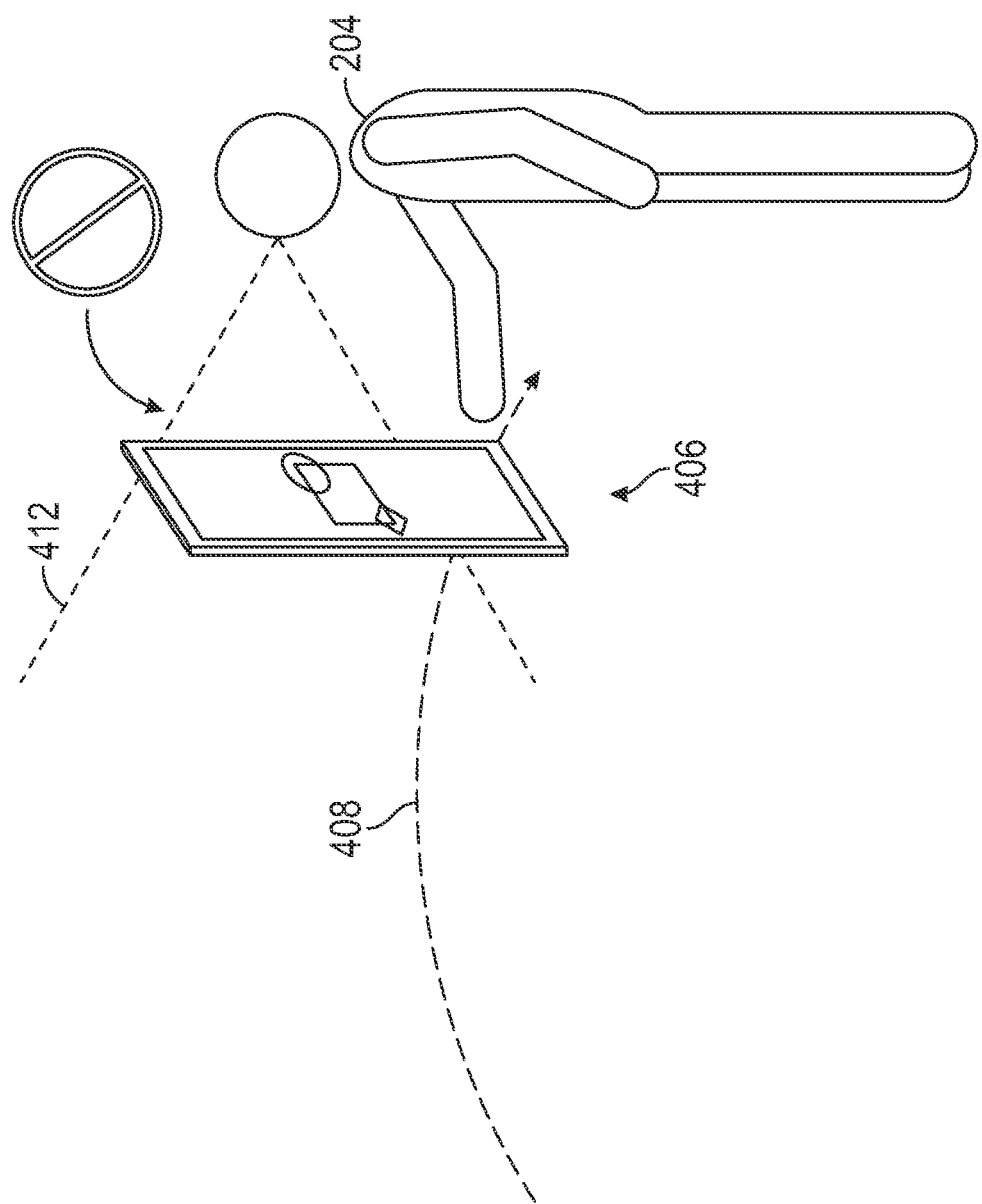
Figure 4C:
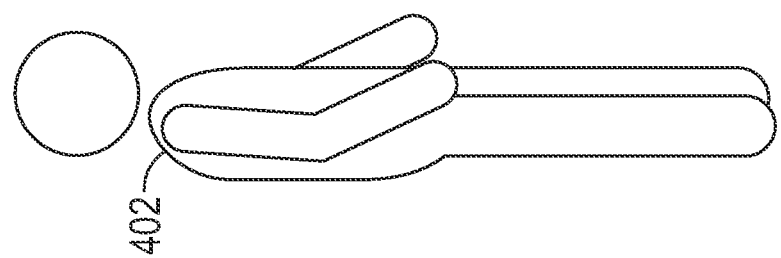

With reference to FIG. 4C, in accordance with the request to transfer virtual object 406, a determination is made as to whether a set of one or more virtual object transfer criteria is satisfied, for instance based on avatar rank, user acceptance, and/or virtual object permissions, as discussed herein. Movement of the virtual object may be displayed in accordance with a determination that the set of one or more virtual object transfer criteria is satisfied. For example, movement of virtual object 406 away from first avatar 402 and towards second avatar 404 may be displayed. Movement may occur along path 408, for example.

Displaying movement of the virtual object may include determining whether to display a reduction in the size of the virtual object so as to avoid obstruction of one or more fields of view. For example, a reduction in the size of the virtual object may be displayed so as to avoid obstruction of field of view 412. Field of view 412 may correspond to the view of a transferee. For example, field of view 412 may correspond to a field of view of a second user associated with second avatar 404. Determining whether to display a reduction in the size of the virtual object may include determining whether a size of the virtual object satisfies a set of one or more size criteria. For example, determining whether a size of the virtual object 406 satisfies a set of one or more size criteria may include determining whether movement of virtual object 406 obstructs field of view 412.

As shown in FIG. 4C, displaying movement of virtual object 406 may cause obstruction of field of view 412 such that a second user associated with second avatar 404 is unable or substantially unable to view the enhanced reality setting. For example, virtual object 406 may obstruct field of view 412 entirely, such that the second user is unable to view any portion of the enhanced reality setting. In some embodiments, virtual object 406 may obstruct at least a threshold percentage of the field of view 412, such as 90% or 50% of the field of view. Obstruction of the field of view 412 may cause the second user to be unable to determine a frame of reference within the enhanced reality setting, and in turn, cause the second user to become disoriented based on the obstructed field of view 412. Obstruction of field of view 412 may negatively impact the user experience associated with the enhanced reality setting, such that continuity with the experience of the enhanced reality setting is interrupted. Accordingly, determining whether a size of the virtual object satisfies a set of one or more size criteria may include determining whether a threshold percentage of a field of view is obstructed. For example, if at least a threshold percentage of 90% of a field of view is obstructed, a determination is made that a size of the virtual object satisfies a set of one or more size criteria. As another example, if at least a threshold percentage of 50% of a field of view is obstructed, a determination is made that a size of the virtual object satisfies a set of one or more size criteria.

Figure 4D:
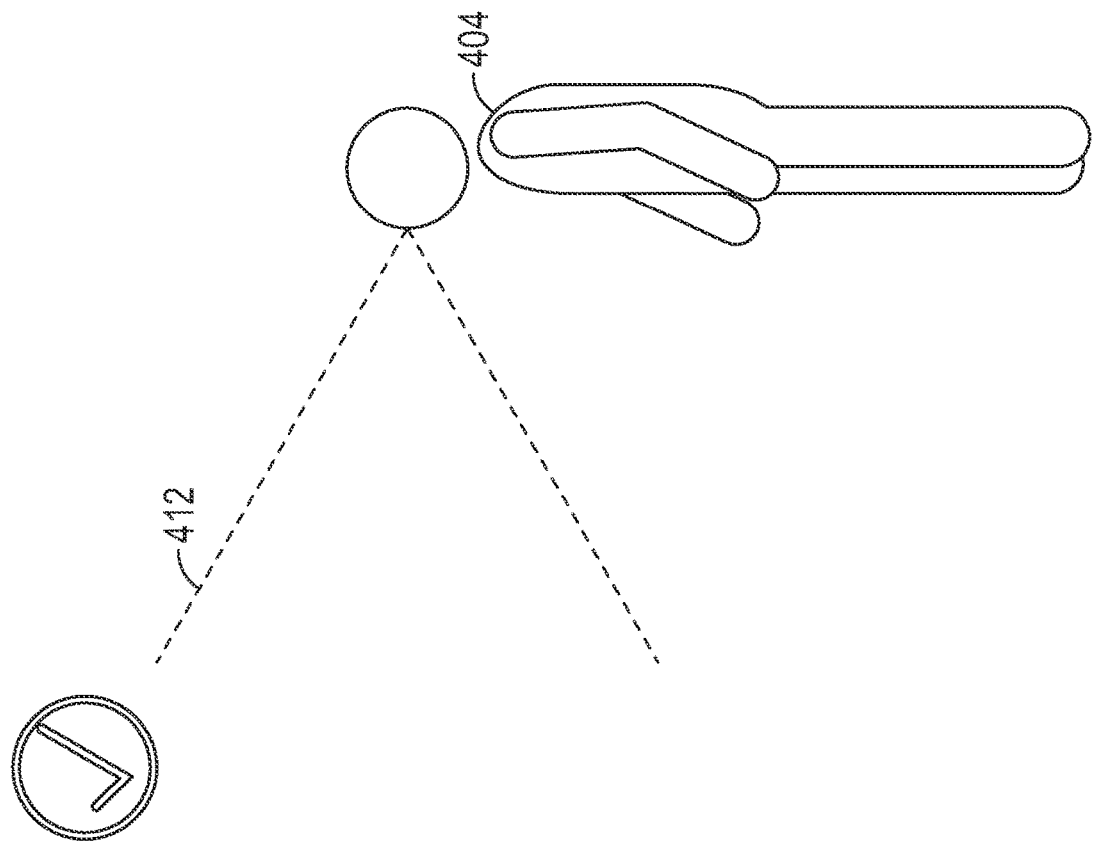
Figure 4D:
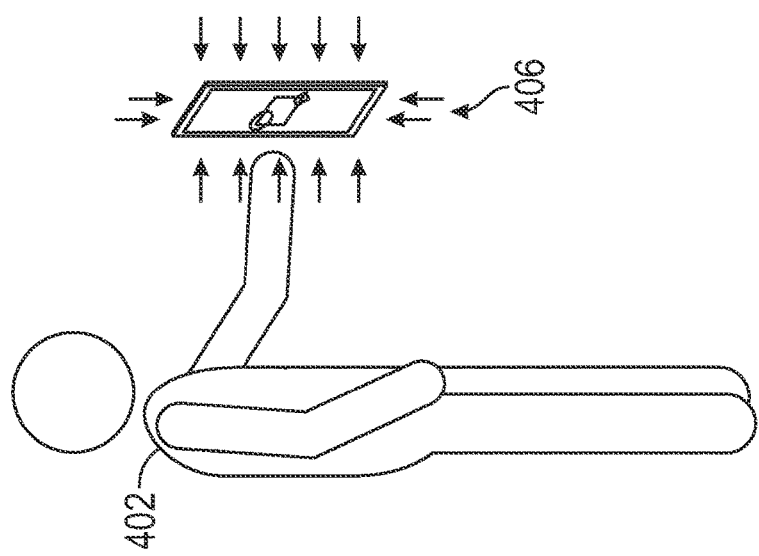
Figure 4E:
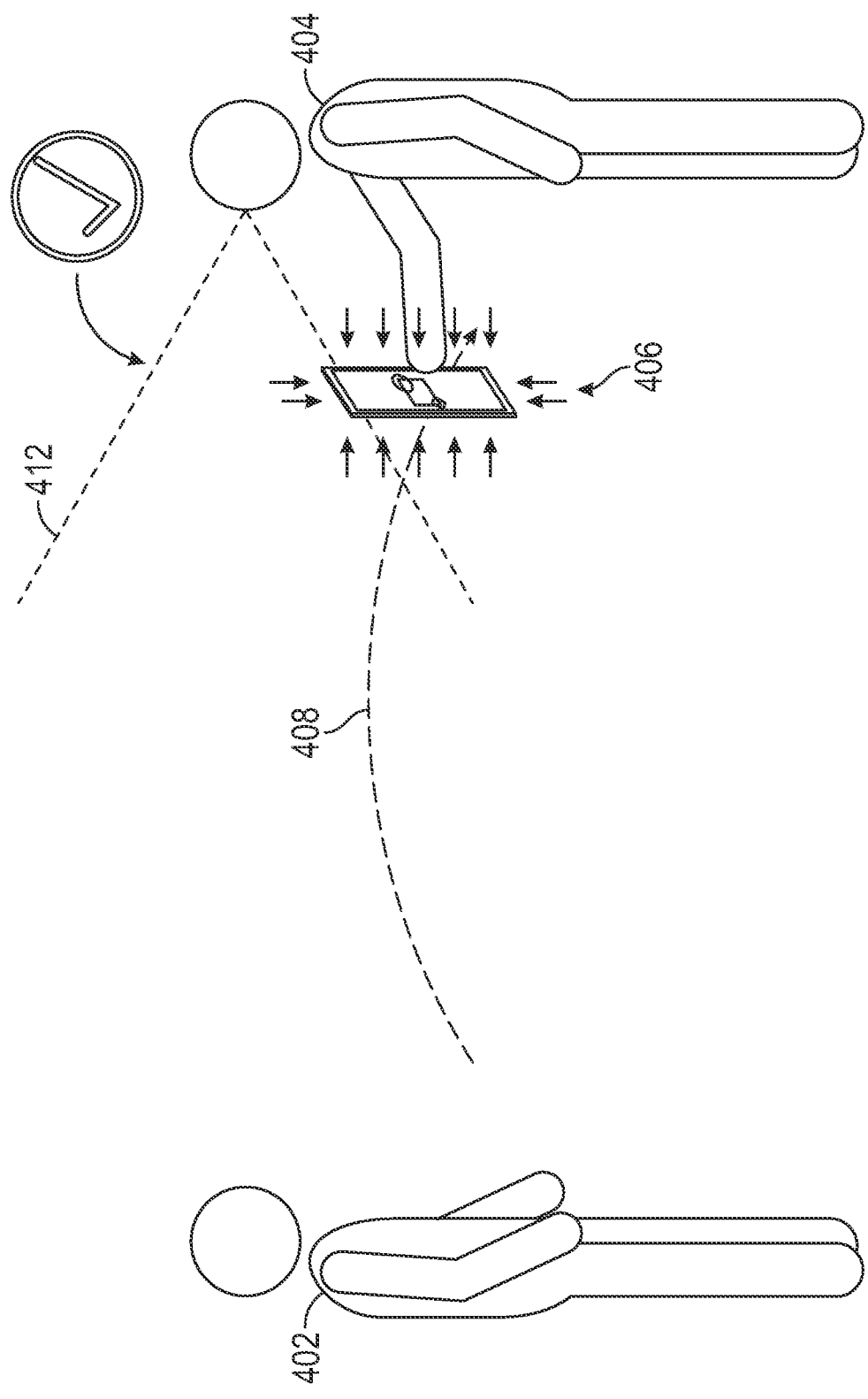

FIGS. 4D-4E illustrate an alternative scenario to FIG. 4C, including displaying a reduction in the apparent size of virtual object 406. For example, the apparent size of virtual object 406 may correspond to the size of virtual object 406 as perceived via one or more fields of view, such as field of view 412. In some embodiments, in accordance with a determination that displaying movement of virtual object 406 causes and/or may cause obstruction of field of view 412, as discussed with respect to FIG. 4C, a reduction in the size of the virtual object 406 is displayed. In some embodiments, the reduction in the size of the virtual object 406 is displayed such that the displayed reduction in size is visible to all users having a field of view including the virtual object 406. For example, since virtual object 406 is visible to both a first user associated with first avatar 402 and a second user associated with second avatar 404, the display in reduction of size of virtual object 406 may be visible within a field of view associated with the first user, and the field of view 412 associated with the second user. In some embodiments, the reduction in the size of the virtual object 406 is displayed such that the displayed reduction in size is only visible to users having a field of view that would be obstructed by movement of virtual object 406. For example, if displaying movement of virtual object 406 without displaying size reduction will only cause obstruction of field of view 412

(e.g., no other fields of view are obstructed except field of view 412), the reduction of size of virtual object 406 may be displayed only with respect to field of view 412.

Referring to FIG. 4E, movement of virtual object 406 may be displayed along path 408 towards second avatar 404. In some embodiments, displaying a reduction in the size of the virtual object 406 may including displaying the reduction at the beginning of displaying movement of virtual object along path 408, such that the size of virtual object 406 is displayed as reduced once the virtual object begins movement along path 408. In some embodiments, displaying a reduction in the size of the virtual object 406 may include displaying the reduction while displaying movement of virtual object along path 408, such that the size of virtual object 406 is reduced as virtual object moves along path 408. As shown in FIG. 4E, displaying a reduction in the size of virtual object 406 may result in the field of view 412 not being obstructed by movement of virtual object 406 toward second avatar 404. For example, the second user associated with second avatar 404 may be able to view the enhanced reality setting and have sufficient view of the enhanced reality setting to determine a frame of reference within the enhanced reality setting upon transfer of the virtual object. As a result, the second user may not become disoriented based on the displayed movement of the virtual object 406 and reduction in the size of the virtual object 406, such that continuity with the second user's experience of the enhanced reality setting is maintained.

Figure 4F:
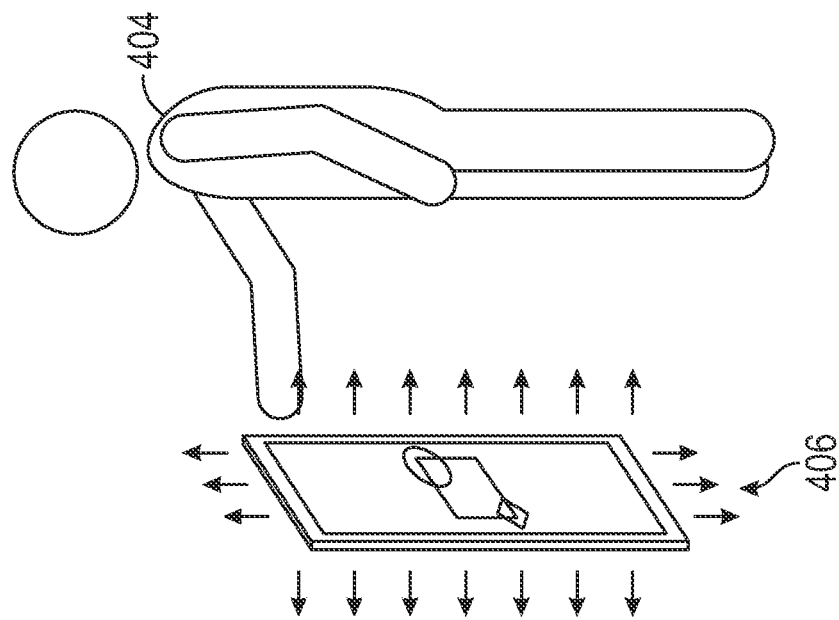

Referring to FIG. 4F, in response to displaying movement of the virtual object 406 away from the first avatar 402 and towards the second avatar 404, completion of the transfer of virtual object 406 from first avatar 402 to second avatar 404 may be depicted by displaying virtual object 406 as following movement of second avatar 404. For example, virtual object 406 following movement of the second avatar 404 may include the virtual object 406 displayed as being controlled by the second avatar 404. In some embodiments, virtual object 406 displayed as following movement of second avatar 404 may include virtual object 406 displayed as proximate to first avatar 402 as discussed herein. In some embodiments, completion of the transfer of virtual object 406 from first avatar 402 to second avatar 404 may include displaying an enlargement of the size of virtual object 406 to an original size. For example, an original size of the virtual object 406 may correspond to the size of the virtual object 406 prior to displaying a reduction in the size of the virtual object 406.

Figure 5B:
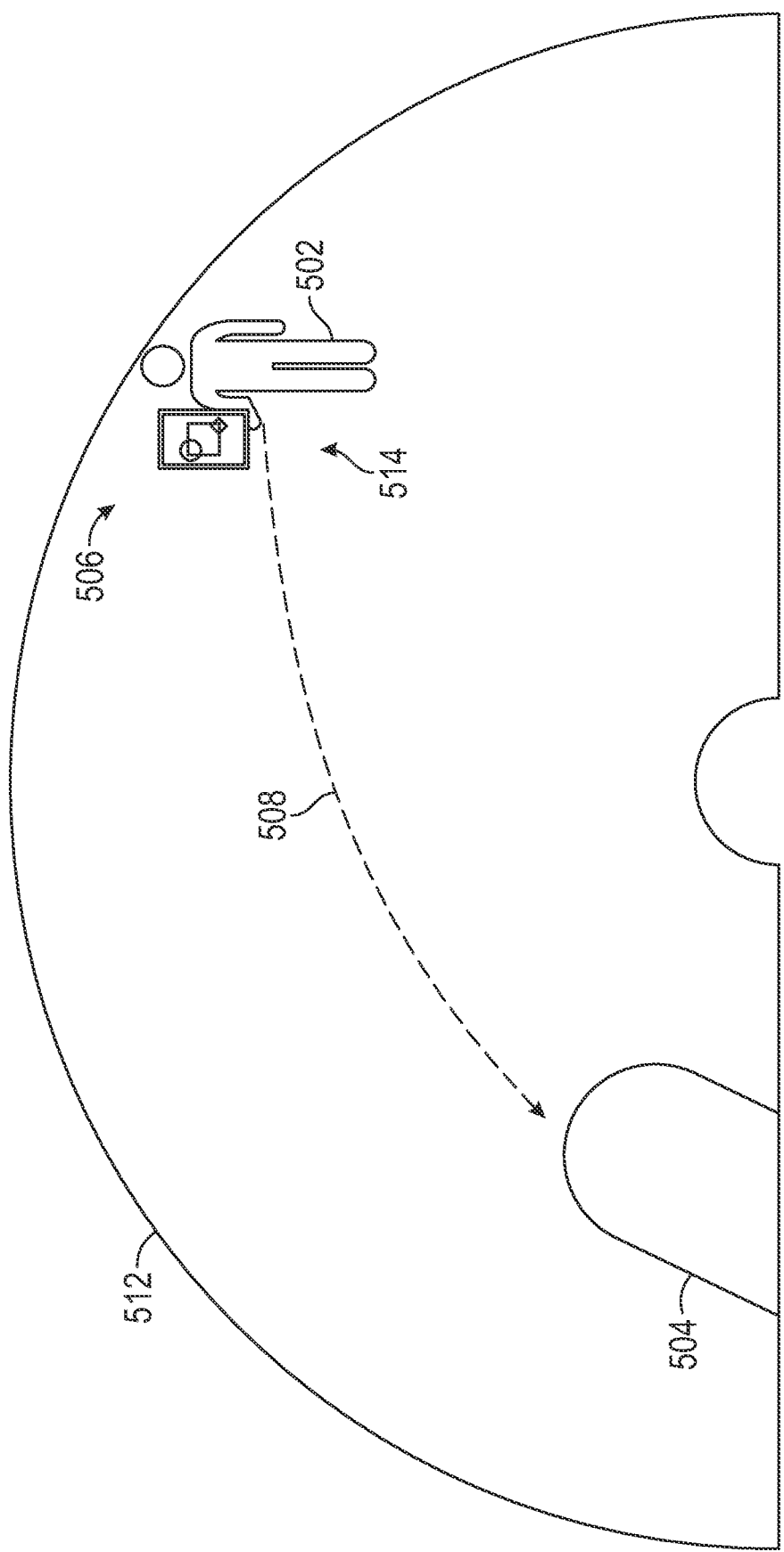

FIGS. 5A-5F depict a transfer of a virtual object in an enhanced reality setting 500 using virtual object size reduction from the perspective of a transferee according to an embodiment. The virtual object transfer depicted in FIGS. 5A-5F may correspond to the virtual object transfer depicted in FIGS. 4A-4F. Referring to FIG. 5A, a user perspective is depicted, including a field of view 512 of a user. Field of view 512 may correspond to the view of a user associated with a transferee avatar, such as second avatar 404 depicted in FIGS. 4A-4F. The view may correspond to the view of enhanced reality setting 500. For example, at least a portion of a second avatar 504 is displayed within field of view 512, such as a hand of a second avatar 504. A first avatar 502 is displayed, within field of view 512, at a distance from the second avatar 504. First avatar 502 may be associated with a virtual object 506, such that virtual object 506 follows movement of the first avatar 502.

Referring to FIG. 5B, a first user associated with first avatar 502 may request a transfer of the virtual object 506. The request to transfer virtual object 506 may cause display of one or more outputs to indicate the request to transfer the virtual object 506. For example, visual feedback 514 within the enhanced reality setting may be displayed, such as proximate to the virtual object 506, in order to indicate that first avatar 502 is requesting transfer of the virtual object. Visual feedback 514 may be visible within field of view 512 of the user associated with second avatar 504, a field of view of a user associated with first avatar 502, and/or any fields of view of users associated with other avatars within the enhanced reality setting. Other types of feedback may be output to indicate the request to transfer the virtual object instead of or in addition to visual feedback.

Figure 5C:
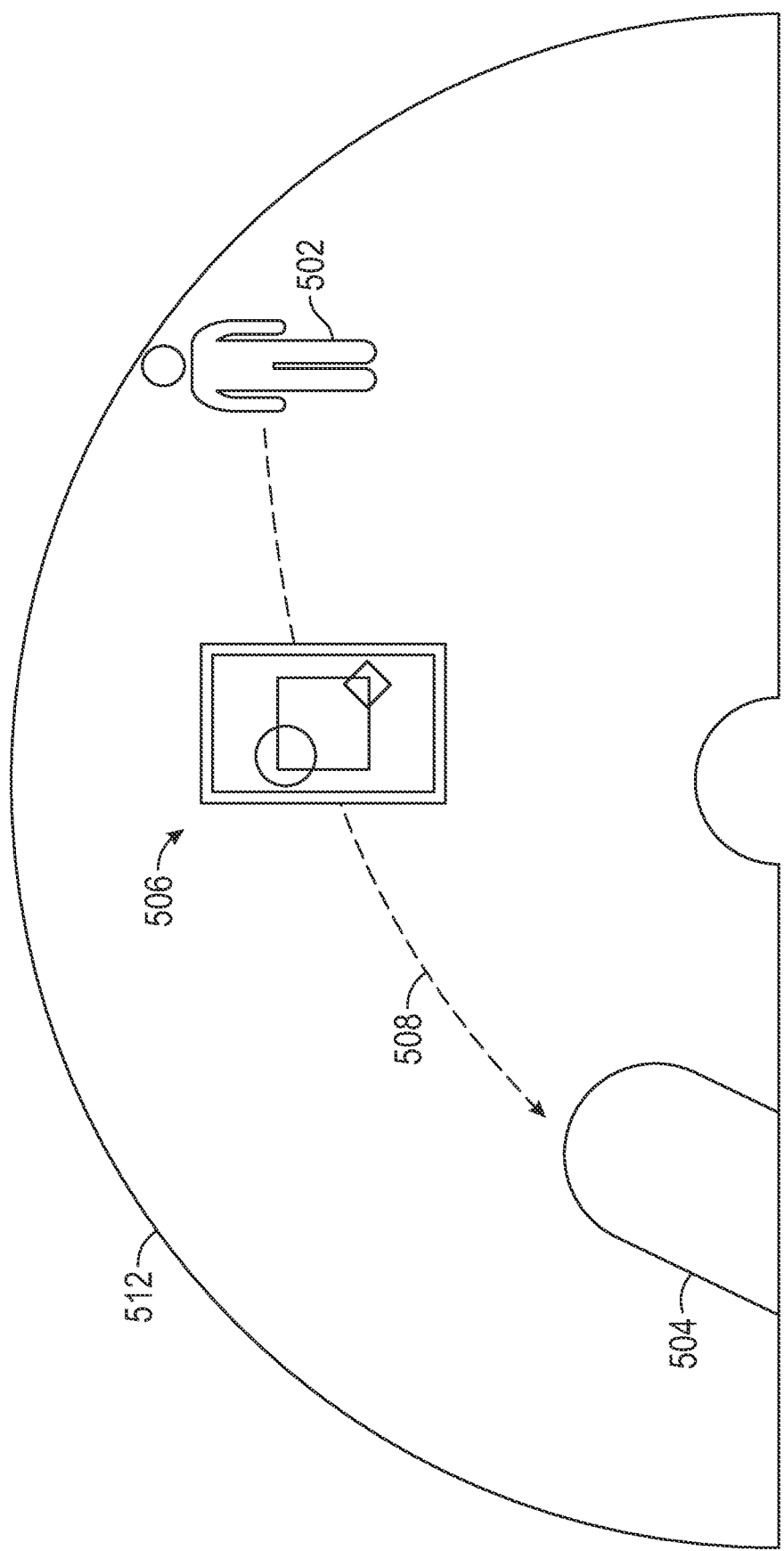
Figure 5D:
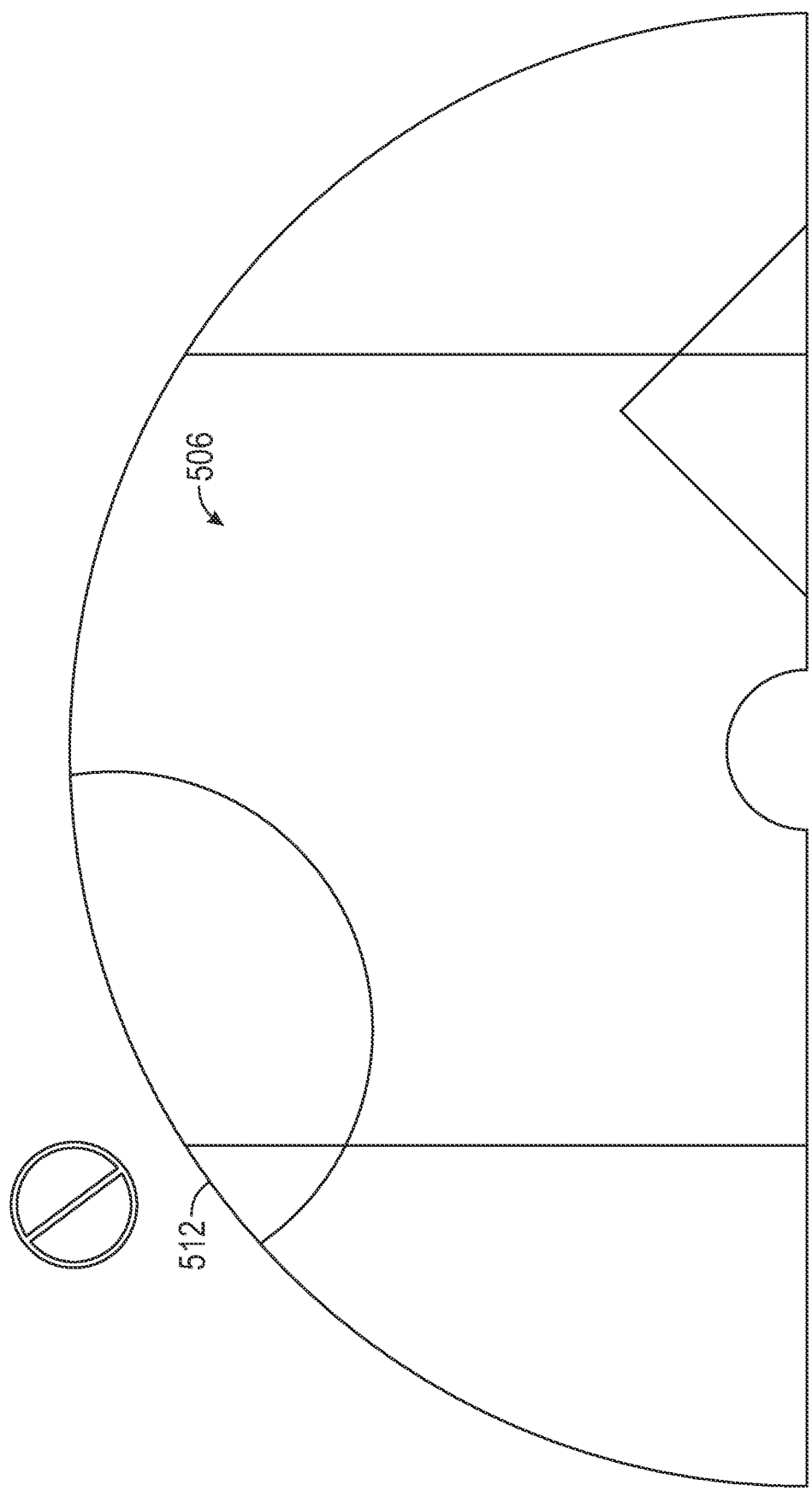

Referring to FIG. 5C, movement of virtual object 506 may be displayed, for example, in accordance with a determination that a set of one or more virtual object transfer criteria is satisfied. Virtual object 506 may be displayed as moving along path 508 within field of view 512. For example, virtual object 506 may be displayed as moving away from first avatar 502 and towards second avatar 504 along path 508. Displaying movement of the virtual object may include determining whether to display a reduction in the size of the virtual object 506 so as to avoid obstruction of one or more fields of view. Referring now to FIG. 5D, displaying movement of virtual object 506 may cause obstruction of field of view 512 such that a second user associated with second avatar 504 is unable or substantially unable to view the enhanced reality setting. For example, as shown in FIG. 5D, virtual object 506 may obstruct field of view 512 entirely, such that the second user is unable to view any portion of the enhanced reality setting. In some embodiments, virtual object 506 may obstruct a specific percentage of the field of view 512, or may obstruct a specific area of the field of view 512. Obstruction of the field of view 512 may cause the second user to be unable to determine a frame of reference within the enhanced reality setting, and in turn, cause the second user to become disoriented based on the field of view 512. As shown in FIG. 5D, since virtual object 506 is displayed as obstructing the entirety of field of view 512, a user associated with field of view 512 is unable to view the enhanced reality setting. This negatively impacts user experience by removing any reference point that the user would utilize in order to maintain a sense of orientation within the environment.

Figure 5E:
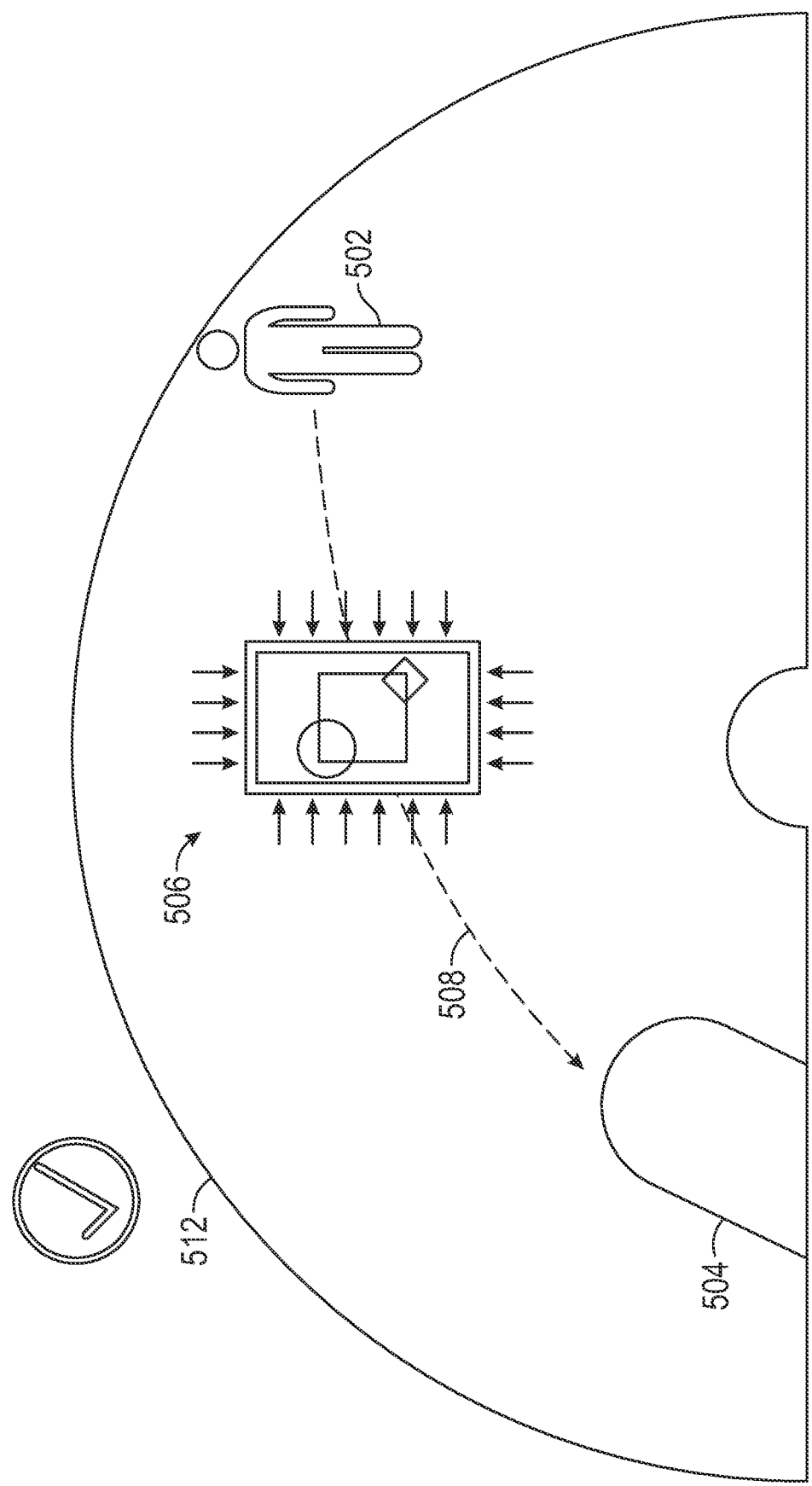
Figure 5F:
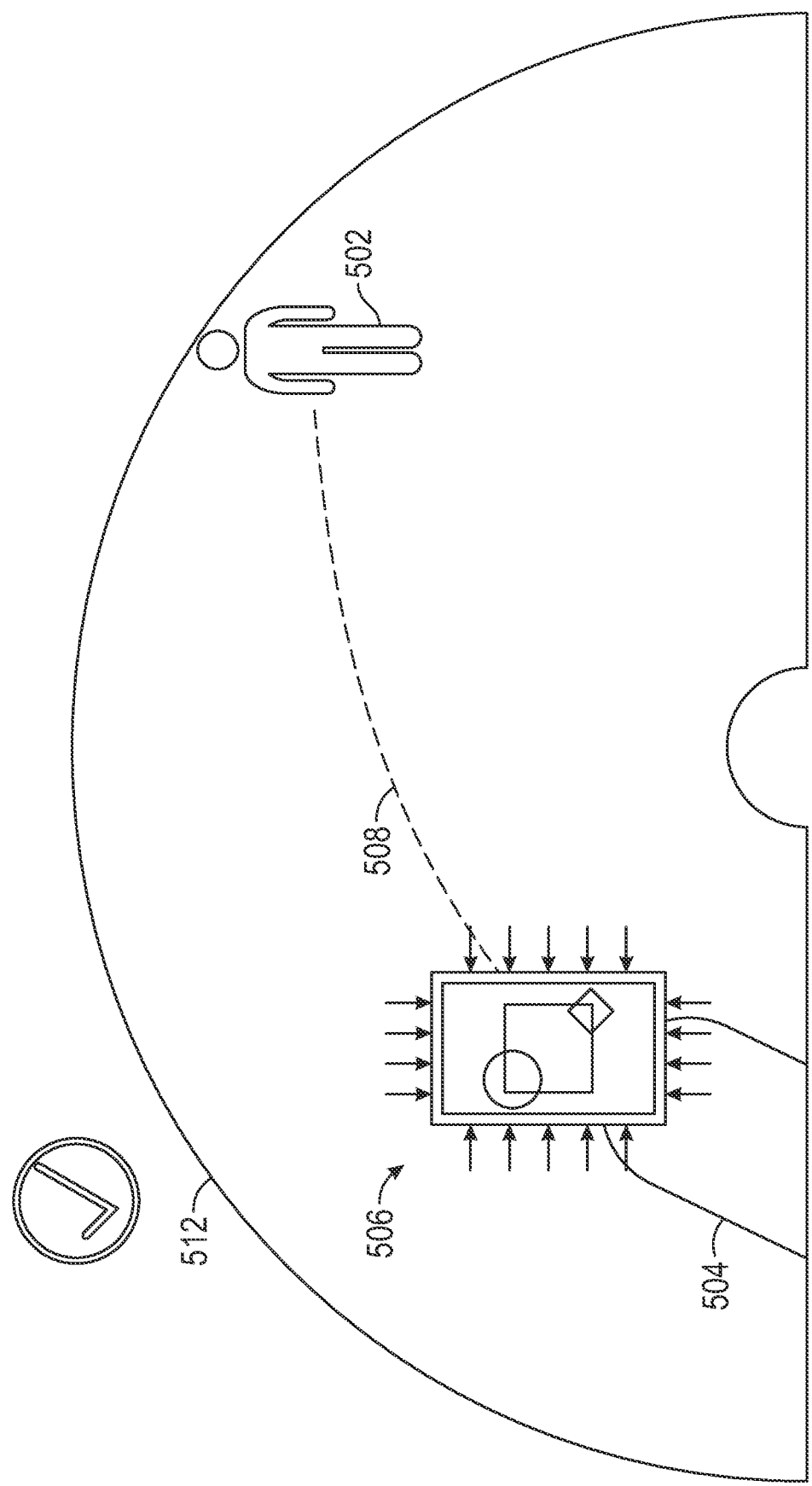

FIGS. 5E-5F illustrate an alternative scenario to FIGS. 5C-5D, including displaying a reduction in the apparent size of the virtual object 506. For example, in accordance with a determination that displaying movement of virtual object 506 may cause obstruction of field of view 512, as discussed with respect to FIG. 5F, a reduction in the size of the virtual object 506 is displayed. In some embodiments, the reduction in the size of the virtual object 506 is displayed prior to virtual object 506 being displayed as moving away from first avatar 502. In some embodiments, the reduction in the size of virtual object 506 is displayed while virtual object 506 is moving towards second avatar 504. For example, once the position of the virtual object 506 becomes proximate to second avatar 504, the size of virtual object 506 is displayed as being reduced.

Referring to FIG. 5F, in response to displaying movement of the virtual object 506 away from the first avatar 502 and towards the second avatar 504, completion of the transfer of virtual object 506 from first avatar 502 to second avatar 504 may be depicted. For example, as shown in FIG. 5F, the virtual object 506 may be displayed as following movement of second avatar 504. In some embodiments, display of the virtual object as following movement of second avatar 504 may include maintaining the display of the virtual object 506 with the reduction in size and displayed proximate to the second avatar 504. In some embodiments, completion of the transfer of virtual object 506 from first avatar 502 to second avatar 504 may include displaying an enlargement of the size of virtual object 506 to an original size. For example, an original size of the virtual object 506 may correspond to the displayed size of the virtual object 506 prior to displaying a reduction in the size of the virtual object 506.

Figure 6A:
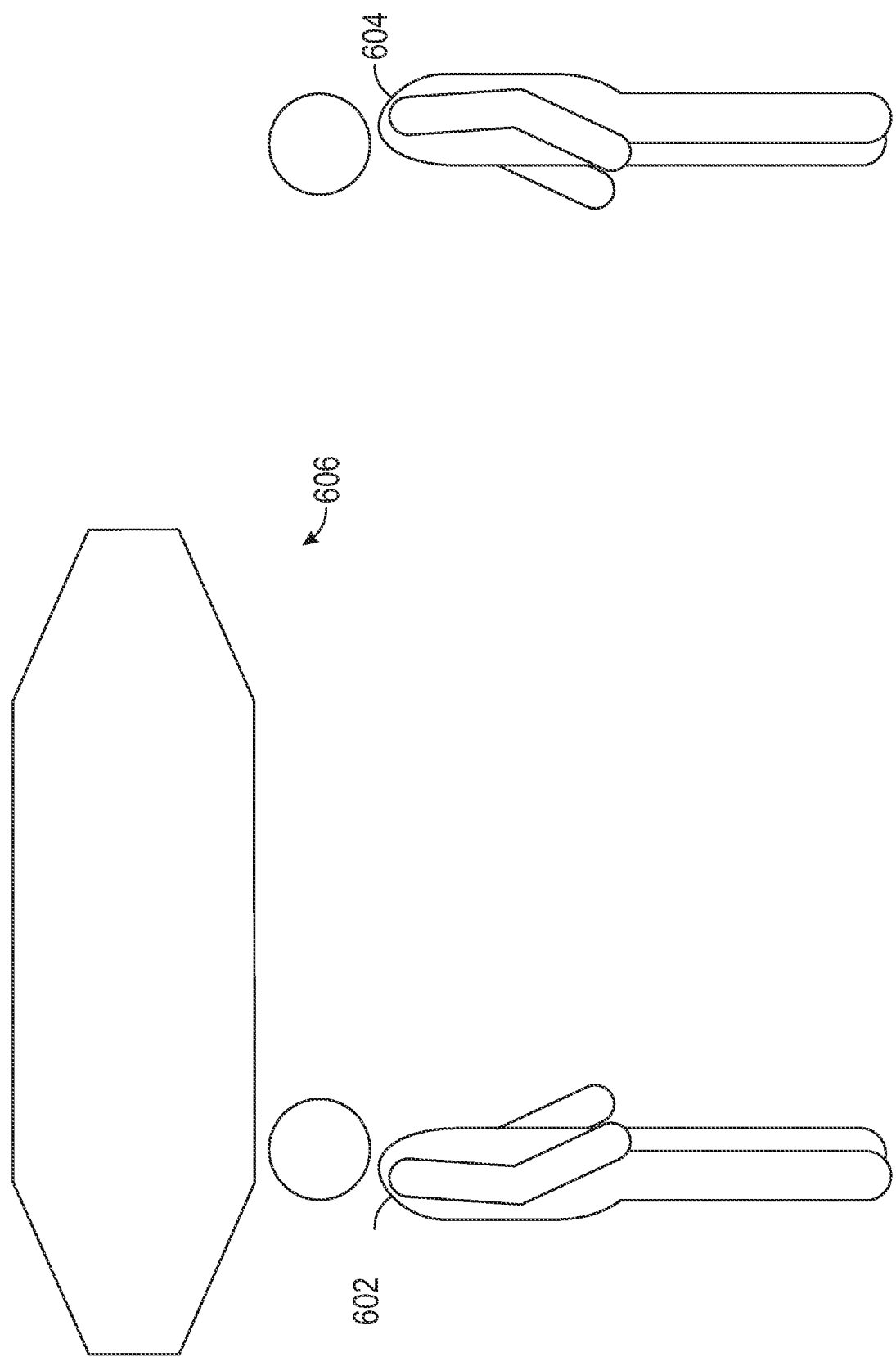

FIGS. 6A-6G depict a transfer of a virtual object in an enhanced reality setting 600 using virtual object size reduction according to an embodiment. Enhanced reality setting 600 may include a first avatar 602, a second avatar 604, and a virtual object 606. As shown in FIG. 6A, virtual object 606 may initially not follow movement of any avatar, such that the virtual object 606 is not being controlled by any avatar. For example, virtual object 606 may initially not follow movement of either first avatar 602 or second avatar 604. In some embodiments, virtual object 606 may be displayed at a distance from one or more avatars. In some embodiments, virtual object 606 may only be displayed as visible to a specific user associated with an avatar. For example, a virtual object may be displayed within an expandable and/or collapsible inventory associated with an avatar (not depicted). For instance, a user associated with an avatar having a corresponding inventory may activate a virtual object from the inventory in order to take an action on the object, such as transferring the virtual object to another avatar, transferring the virtual object to another inventory, and/or transferring the virtual objet to another location within the enhanced reality setting, for example.

Figure 6B:
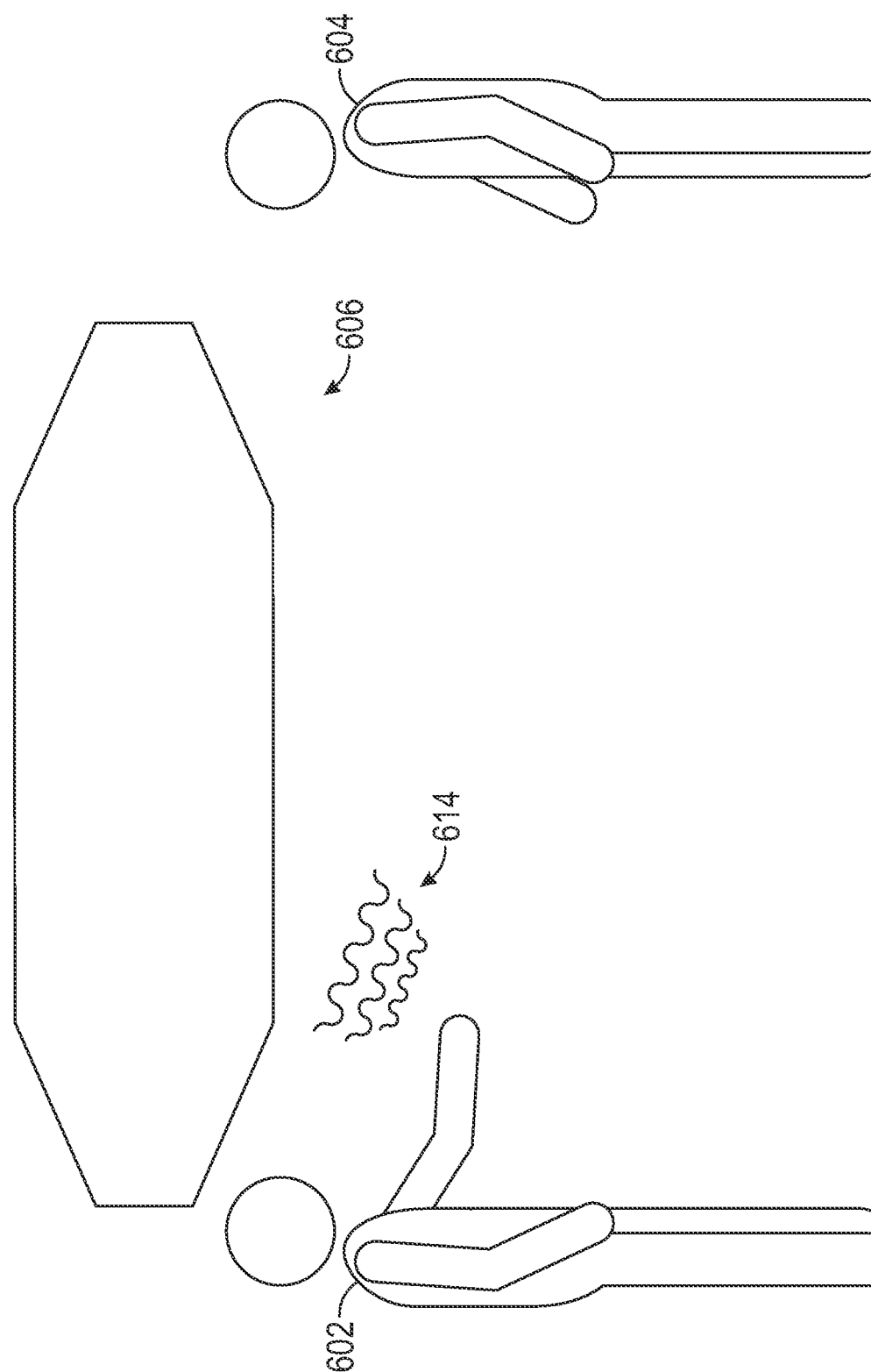

Referring now to FIG. 6B, first avatar 602 may activate virtual object 606. For example, a first user associated with first avatar 602 may interact with one or more inputs in order to cause first avatar 602 to activate virtual object 606. Upon activation of virtual object 606 by first avatar 602, virtual object 606 may be displayed as moving toward first avatar 602. For example, one or more visual outputs 616 may be displayed within the enhanced reality setting to depict virtual object 606 as moving towards user 602. A user associated with first avatar 602 may wish to transfer object 606 to second avatar 604. Accordingly, the user may activate virtual object 606 in order to request transfer of the virtual object 606 to second avatar 604. In response to activation of virtual object 606, virtual object 606 may be displayed as following movement of first avatar 602.

Figure 6C:
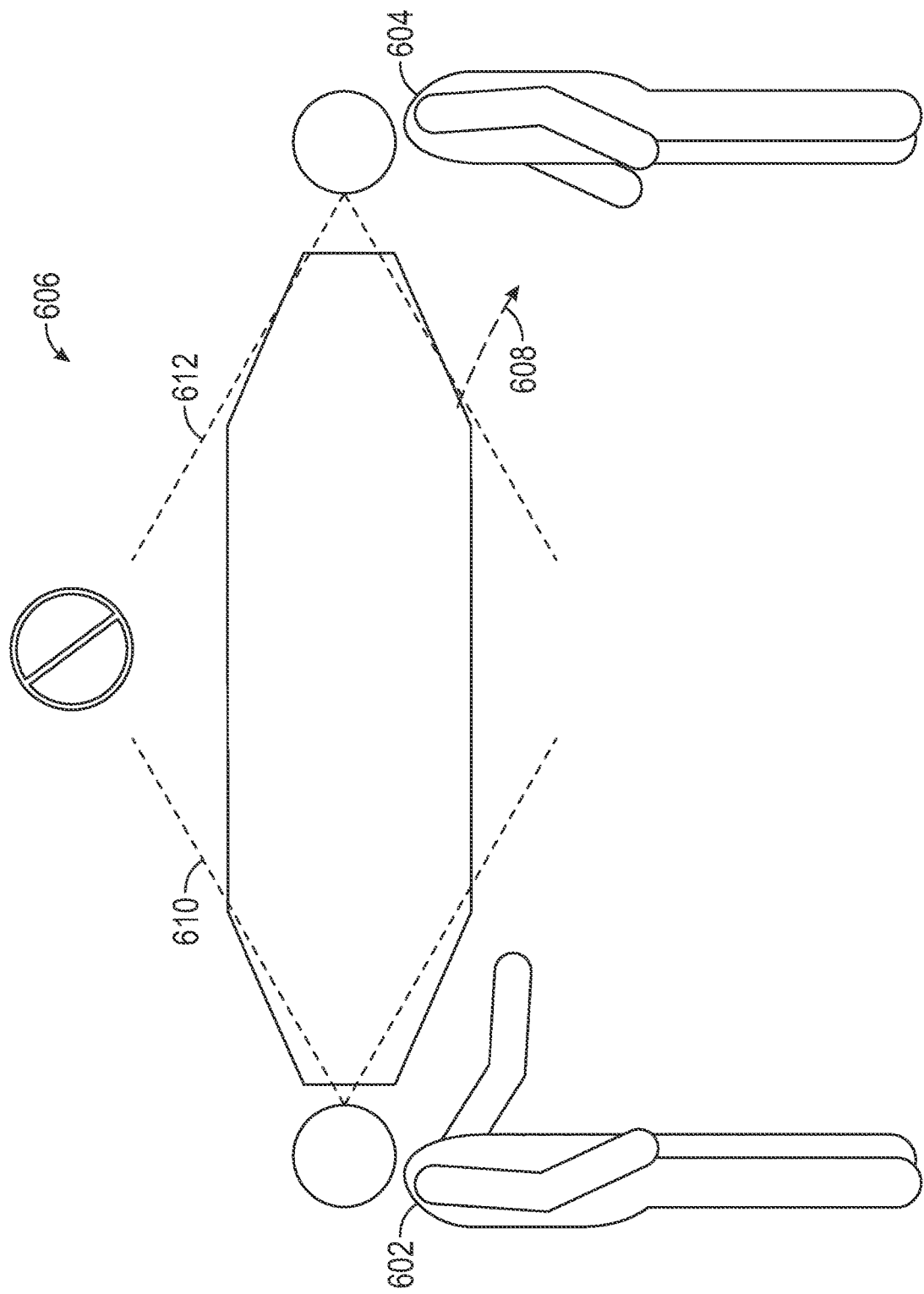
Figure 6D:
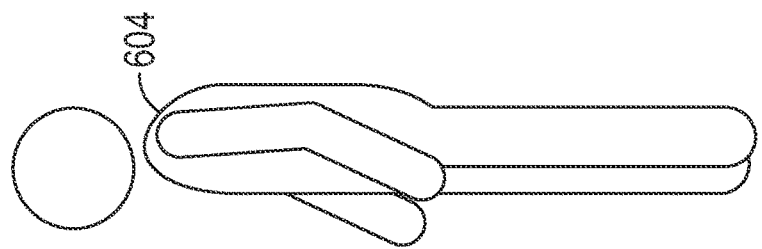
Figure 6D:
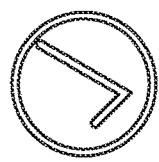
Figure 6D:
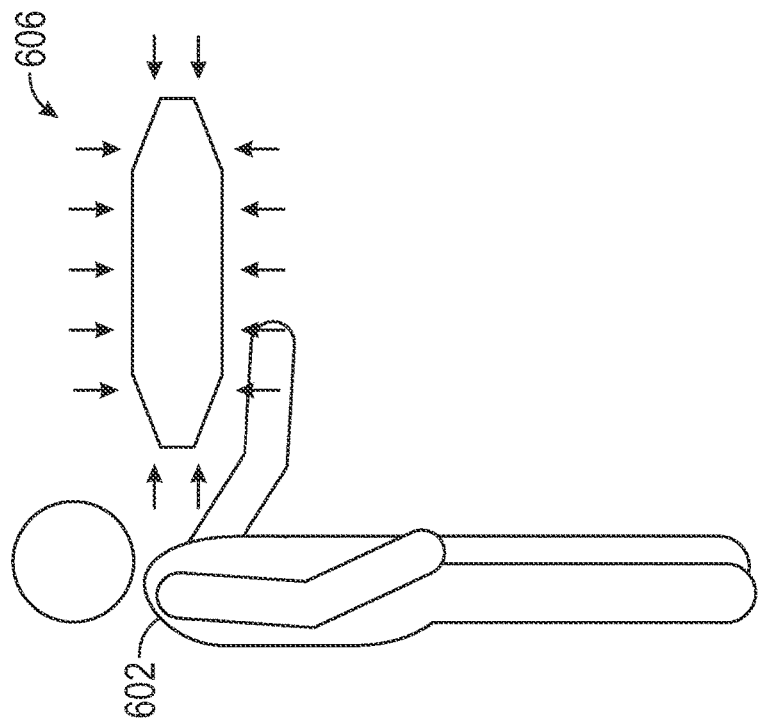

Referring now to FIG. 6C, displaying movement of virtual object 606 towards first avatar 602, such that virtual object 606 follows movement of first avatar 602, may include determining whether to reduce the size of the virtual object so as to avoid obstruction of field of view 610 associated with first avatar 602 or field of view 612 associated with second avatar 604. For example, determining whether to display a reduction in the size of the virtual object so as to avoid obstruction of field of view 610 associated with first avatar 602 may include determining whether a size of virtual object 606 satisfies a set of one or more size criteria. In accordance with a determination that a size of virtual object 606 satisfies the set of one or more size criteria, a reduction in the size of the virtual object is displayed. In some embodiments, activation of the virtual object 606 by a user associated with first avatar 602 may include a user activating an object that causes obstruction of the field of view 610 associated with the user. For example, a large object, such as virtual object 606, may obstruct the field of view 610 based on the object following movement of first avatar 602. By being displayed proximate to first avatar 602, the virtual object 606 may obstruct the field of view 610 based on the size of the virtual object even without any transfer of the virtual object 606 to another avatar. In some embodiments, activation of the virtual object 606 by a user associated with first avatar 602 may cause obstruction of a field of view 612 associated with second avatar 604. For example, by being displayed proximate to first avatar 602, the virtual object 606 may obstruct the field of view 610 based on the large size of the virtual object even without any transfer of the virtual object 606.

FIGS. 6D-6G illustrate an alternative scenario to FIG. 6C, including displaying a reduction in the apparent size of the virtual object 606. For example, in response to activation of virtual object 606 by a user associated with first avatar 602, virtual object 606 may be displayed as following movement of first avatar 602. As described above, displaying a virtual object as following movement of an avatar may cause obstruction of a user's field of view such that the user associated with the avatar is unable or substantially unable to view the enhanced reality setting. In accordance with a determination that displaying movement of virtual object 606 may cause obstruction of field of view 610, a reduction in the size of the virtual object 606 is displayed. For example, upon activation of the virtual object 606 by a first user associated with first avatar 602, a reduction in the size of the virtual object 606 may be displayed. In some embodiments, the reduction in the size of the virtual object 606 is displayed prior to the virtual object 606 being displayed as moving towards first avatar 602 and following movement first avatar 602. In some embodiments, the reduction in the size of the virtual object 606 is displayed while the virtual object 606 being displayed as moving towards first avatar 602 and following movement first avatar 602.

Figure 6E:
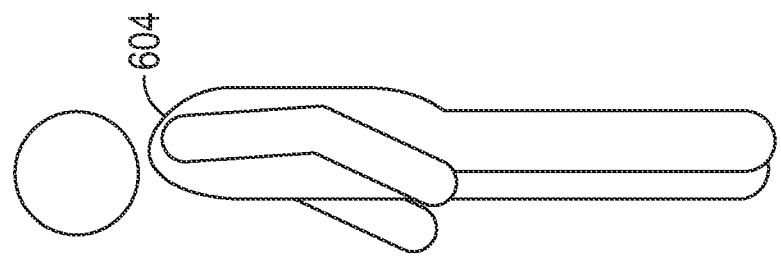
Figure 6E:
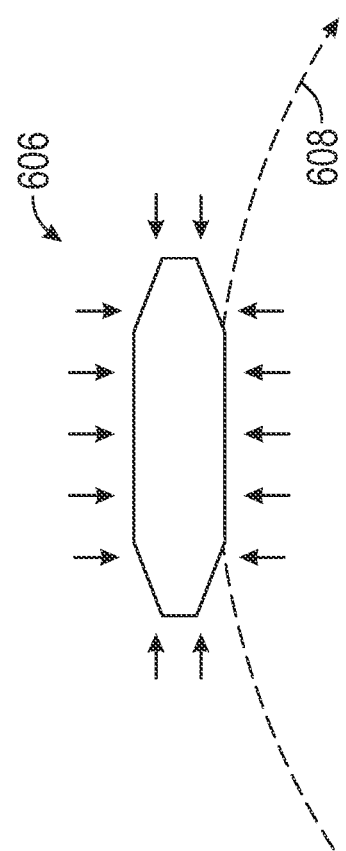
Figure 6E:
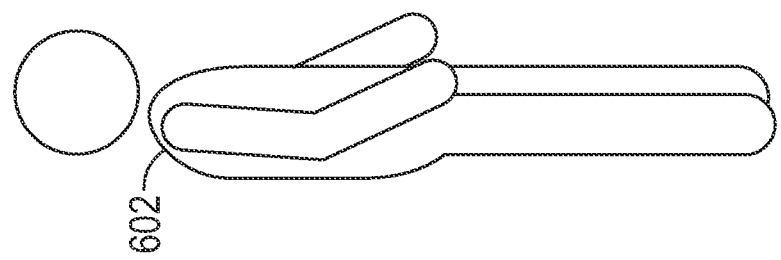
Figure 6F:
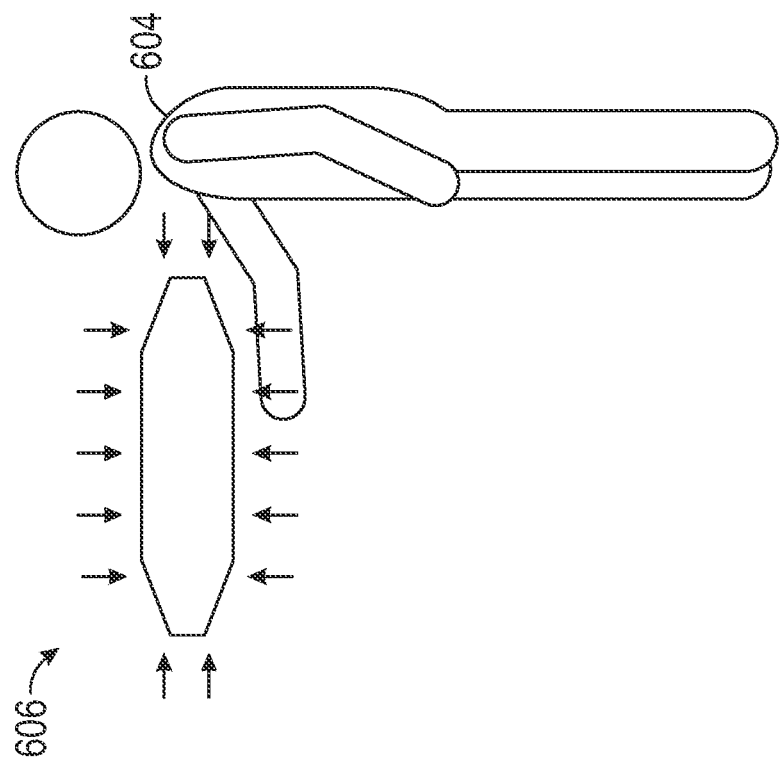
Figure 6F:
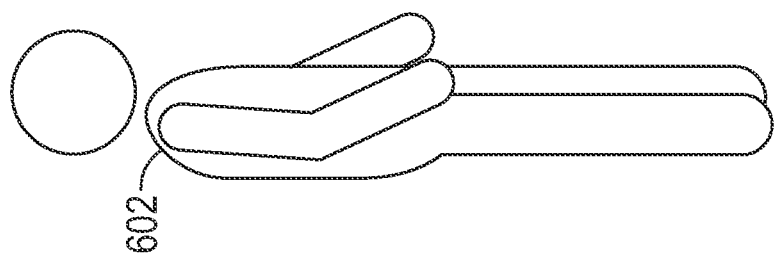

Referring to FIG. 6E-6G, in accordance with displaying a reduction in the size of the virtual object 606 upon activation of virtual object 606 by a first user associated with first avatar 602, further movement of the virtual object may be displayed. For example, in response to the request to transfer virtual object 606, virtual object 606 may be displayed as moving away from first avatar 602 and towards second avatar 604 along path 608. Completion of the transfer of virtual object 606 from first avatar 602 to second avatar 604 may be depicted by displaying virtual object 606 as following movement of second avatar 604, for example, as shown in FIG. 6F. Completion of the transfer of virtual object 606 from first avatar 602 to second avatar 604 may include displaying an enlargement of the size of virtual object 606 to an original size, for example, as shown in FIG. 6G. In some embodiments, an original size of the virtual object 606 may correspond to the displayed size of the virtual object 606 prior to activation of the virtual object by a first user associated with first avatar 602, such as an original size of virtual object 606 as depicted in FIG. 6A.

Figure 7A:
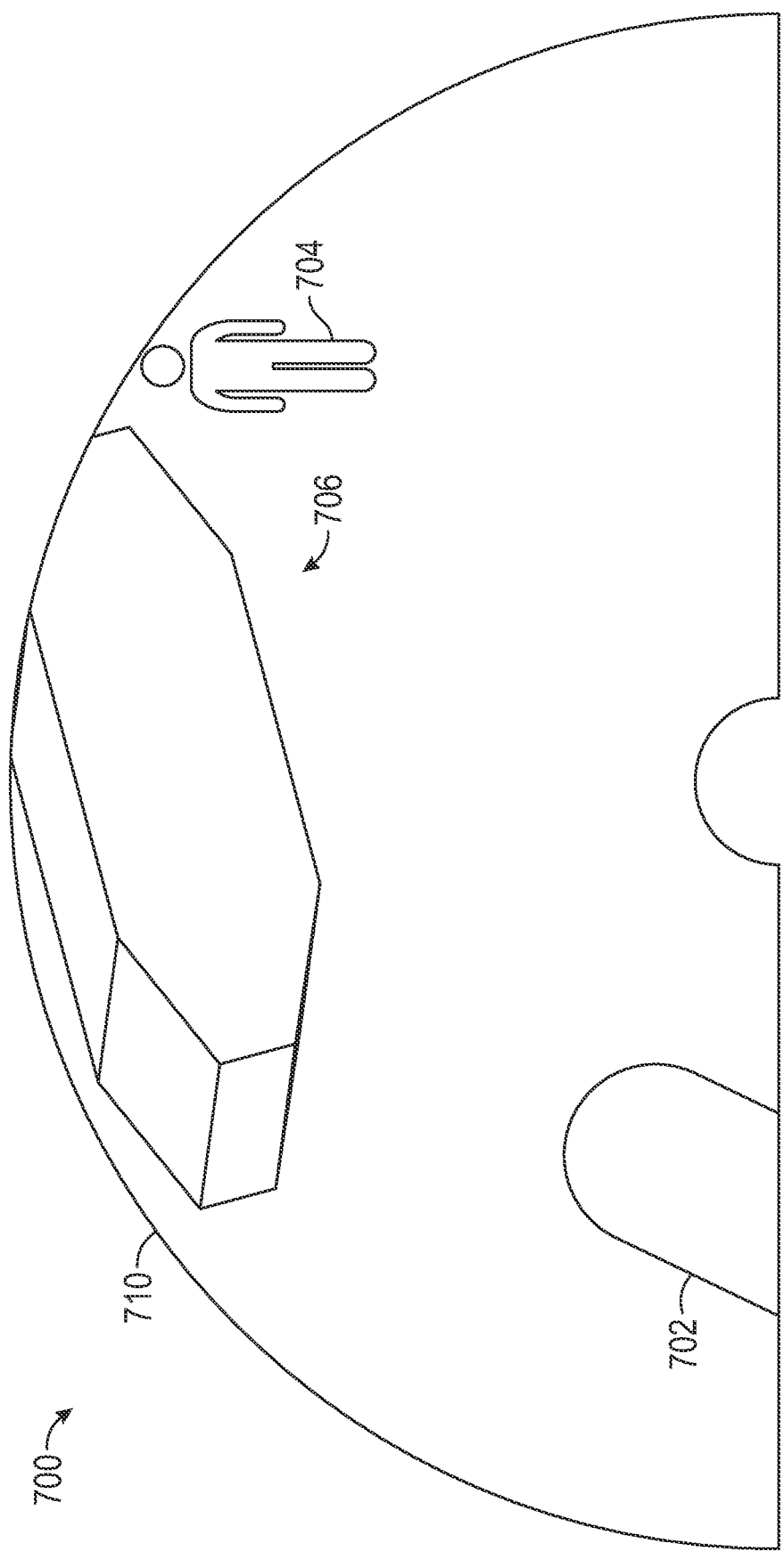
FIGS. 7A-7G depict a transfer of a virtual object in an enhanced reality setting using virtual object size reduction from the perspective of a transferor according to an embodiment.

FIGS. 7A-7G depict a transfer of a virtual object in an enhanced reality setting 700 using virtual object size reduction from the perspective of a transferor according to an embodiment. The virtual object transfer depicted in FIGS. 7A-7G may correspond to the virtual object transfer depicted in FIGS. 6A-6G. Referring to FIG. 7A, a user perspective is depicted, including a field of view 710 of a user. Field of view 710 may correspond to a view of a user associated with a transferor avatar, such as first avatar 602 depicted in FIGS. 6A-6G. The view may correspond to a view of enhanced reality setting 700. For example, at least a portion of a first avatar 702 is displayed within field of view 710, such as a hand of a first avatar 702. A second avatar 704 is displayed, within field of view 710, at a distance from the first avatar 702. Virtual object 706 may be displayed within field of view 710. As shown in FIG. 7A, virtual object 706 may initially not follow movement of any avatar, such that the virtual object 706 is not being controlled by any avatar. For example, virtual object 706 may initially not follow movement of either first avatar 702 or second avatar 704.

Figure 7B:
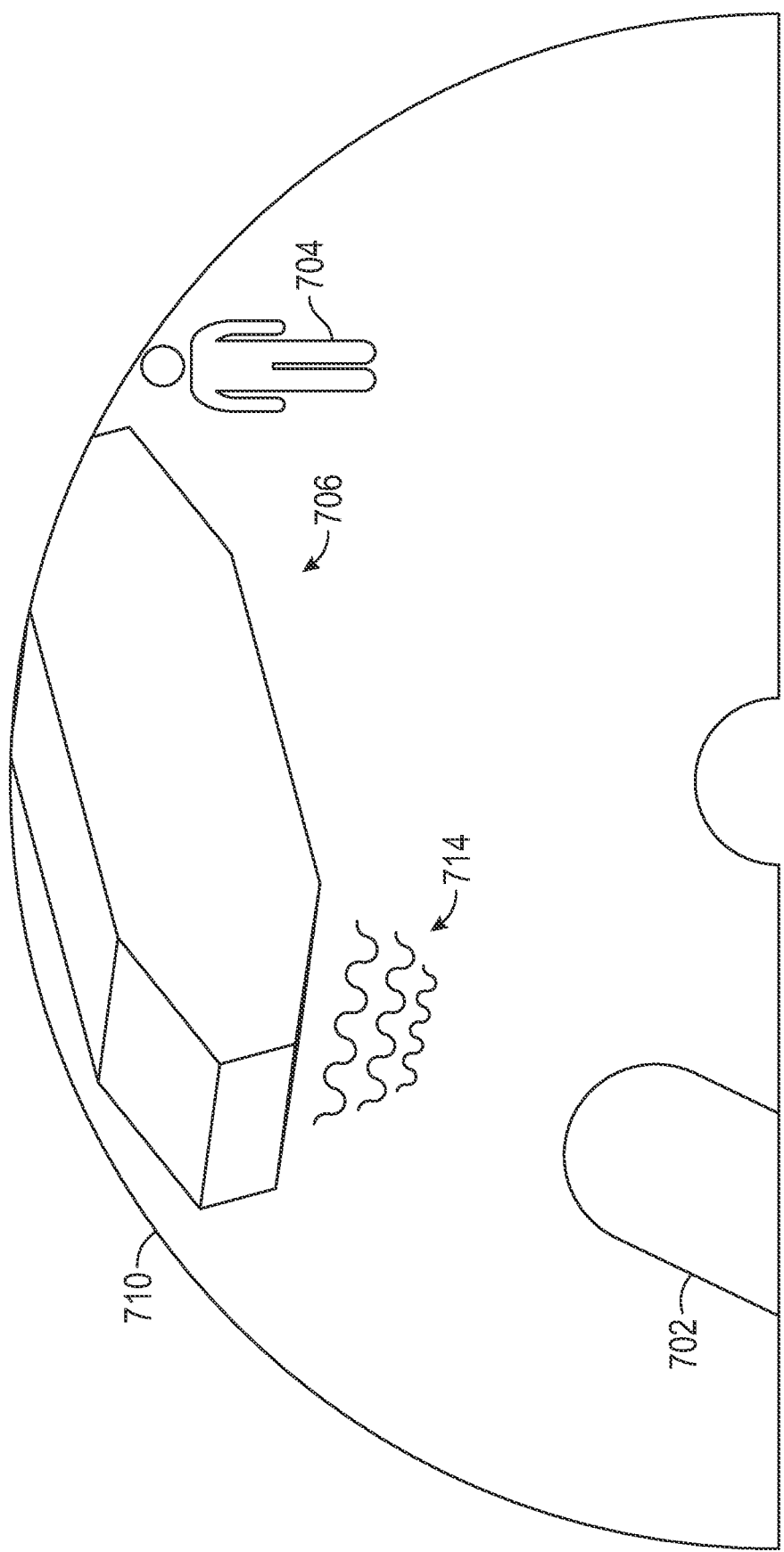

Referring to FIG. 7B, a first user associated with avatar 702 may activate virtual object 706, for example, in order to request a transfer of the virtual object 706. In some embodiments, a first user may activate the virtual object for reasons other than to request a transfer of the virtual object, such as to take control of the virtual object and move to a new location with virtual object 706. In some embodiments, the activation of a virtual object may cause display of one or more outputs to indicate the activation of virtual object. For example, visual feedback 714 within the enhanced reality setting may be displayed, such as proximate to the virtual object 706, in order to indicate that first avatar 702 is activating or attempting to activate the virtual object 706. Visual feedback 714 may be visible within field of view 710 of the user associated with first avatar 702, a field of view of a user associated with second avatar 704, and/or any fields of view of users associated with other avatars within the enhanced reality setting. Other types of feedback may be output to indicate the request to transfer the virtual object instead of or in addition to visual feedback.

Figure 7C:
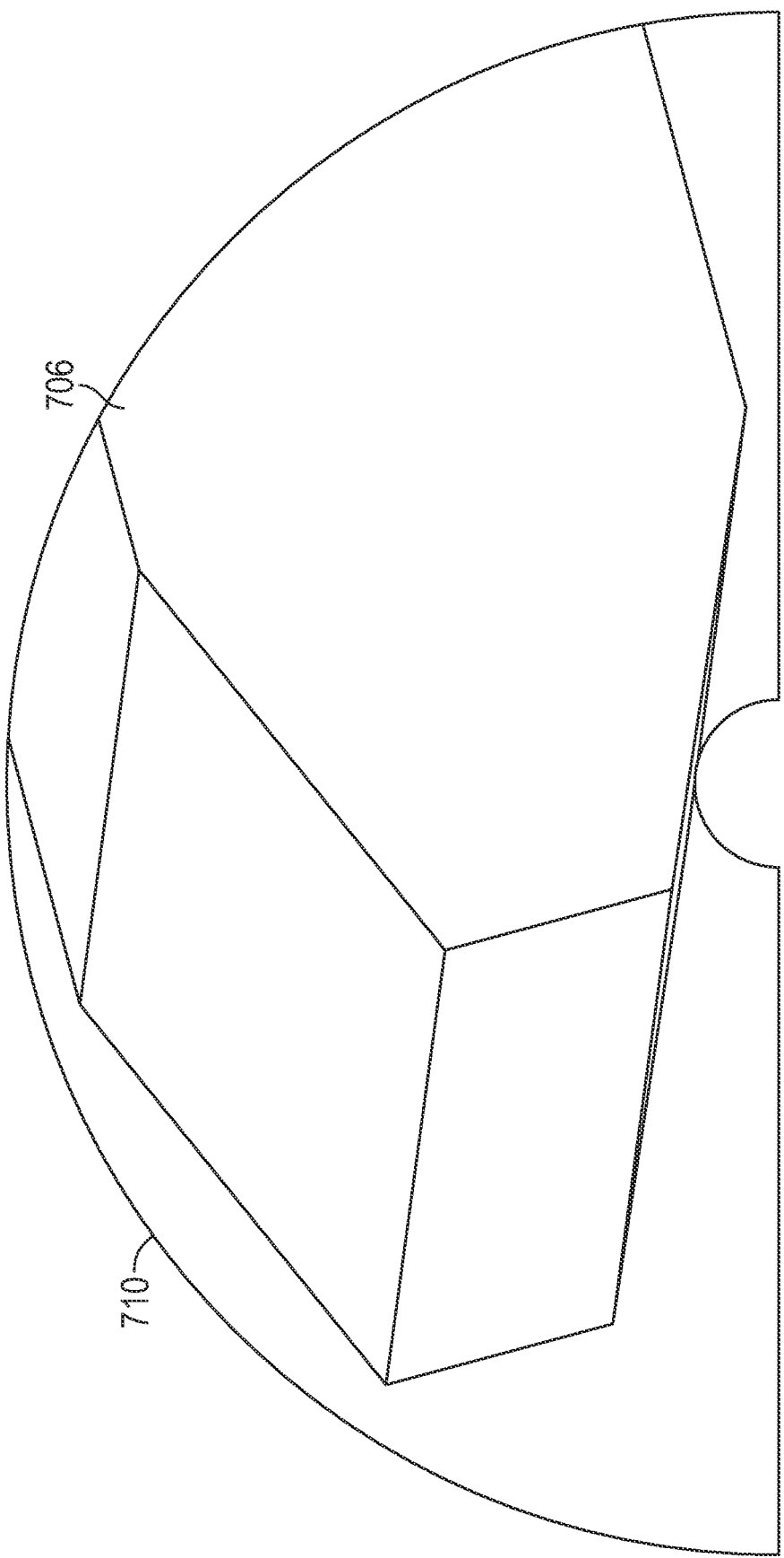
Figure 7D:
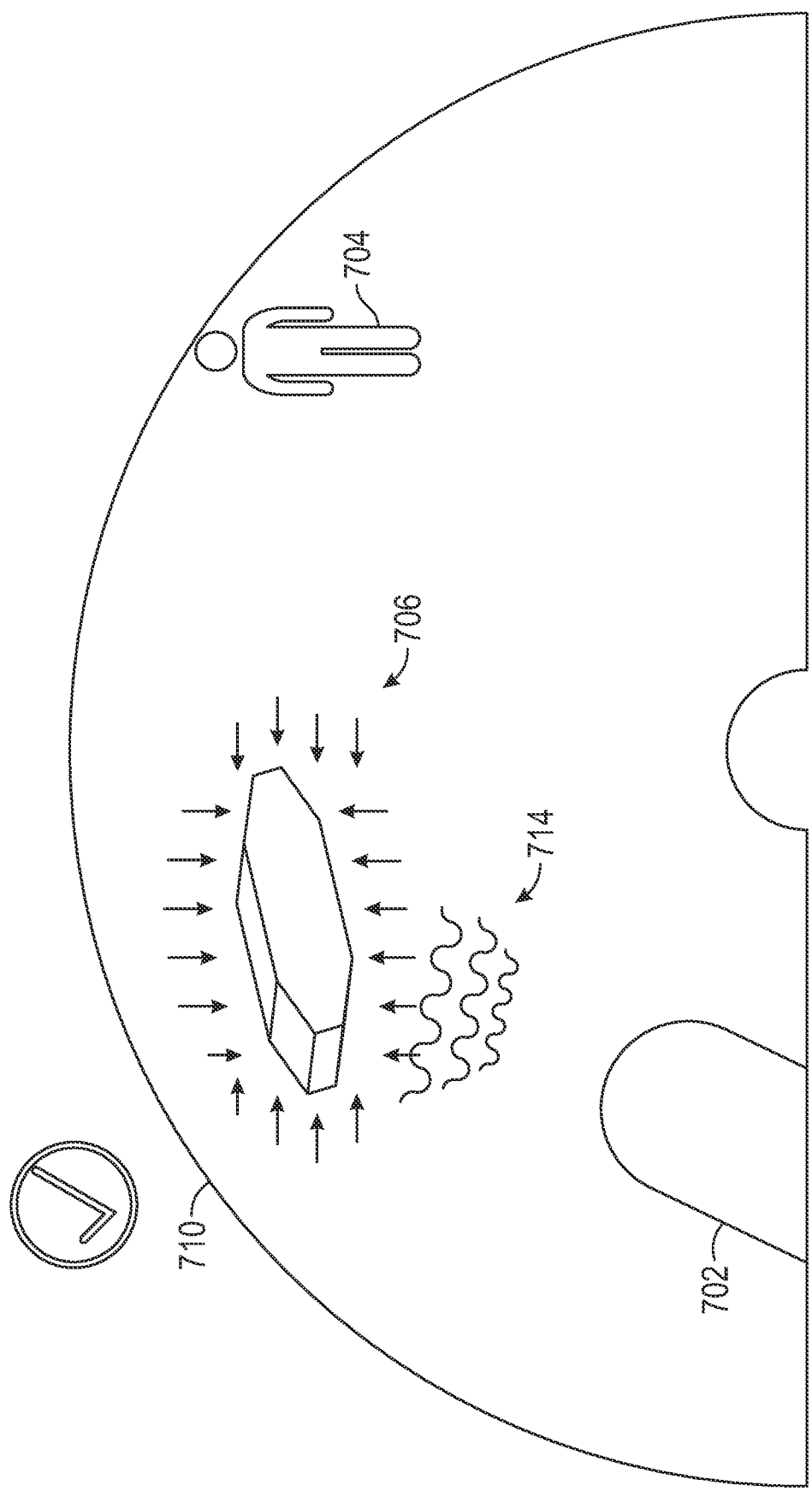

Referring now to FIG. 7C, displaying movement of virtual object 706 towards first avatar 702, such that virtual object 706 follows movement of first avatar 702, may include determining whether to reduce the size of the virtual object so as to avoid obstruction of field of view 710 associated with first avatar 702. In some embodiments, activation of the virtual object 706 by a user associated with first avatar 702 may include a user activating an object that causes obstruction of the field of view 710 associated with the user. A large object, such as virtual object 706, may obstruct the entirety of the field of view 710 based on the object following movement of first avatar 702, as shown for example in FIG. 7C. By being displayed proximate to first avatar 702, the virtual object 706 may obstruct the field of view 710 based on the size of the virtual object even without any transfer of the virtual object 706.

FIGS. 7D-7G illustrate an alternative scenario to FIG. 7C, including displaying a reduction in the apparent size of the virtual object 706. For example, in accordance with a determination that displaying movement of virtual object 706 towards first avatar 702 may cause obstruction of field of view 710, as discussed with respect to FIG. 7C, a reduction in the size of the virtual object 706 is displayed. In some embodiments, the reduction in the size of the virtual object 706 is displayed prior to virtual object 706 being displayed as moving towards first avatar 702. In some embodiments, the reduction in the size of virtual object 706 is displayed while virtual object 706 is moving towards first avatar 702. For example, once the position of the virtual object 706, as displayed in the enhanced reality setting, becomes proximate to first avatar 702, the size of virtual object 706 is displayed as being reduced.

Figure 7E:
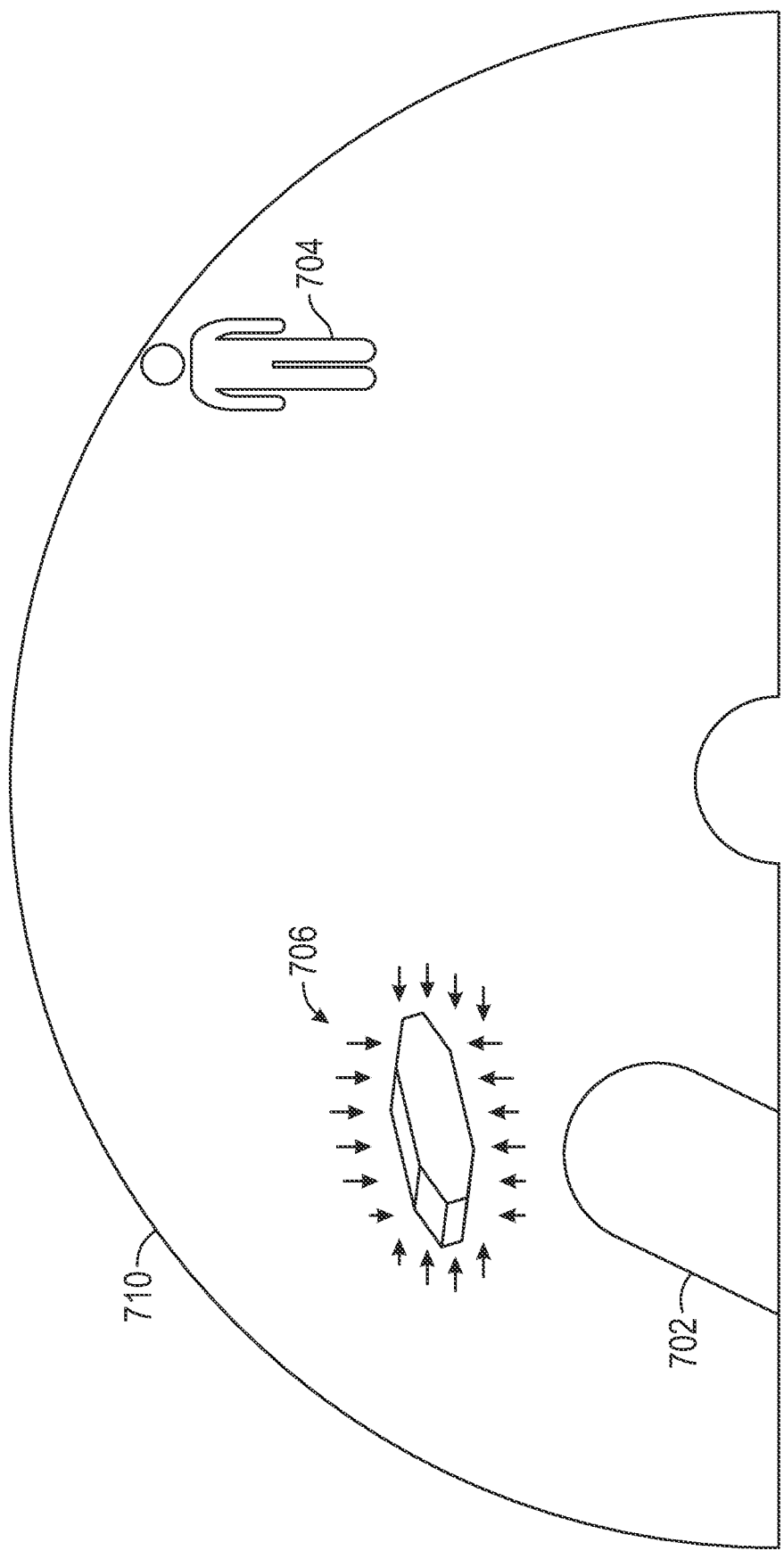
Figure 7F:
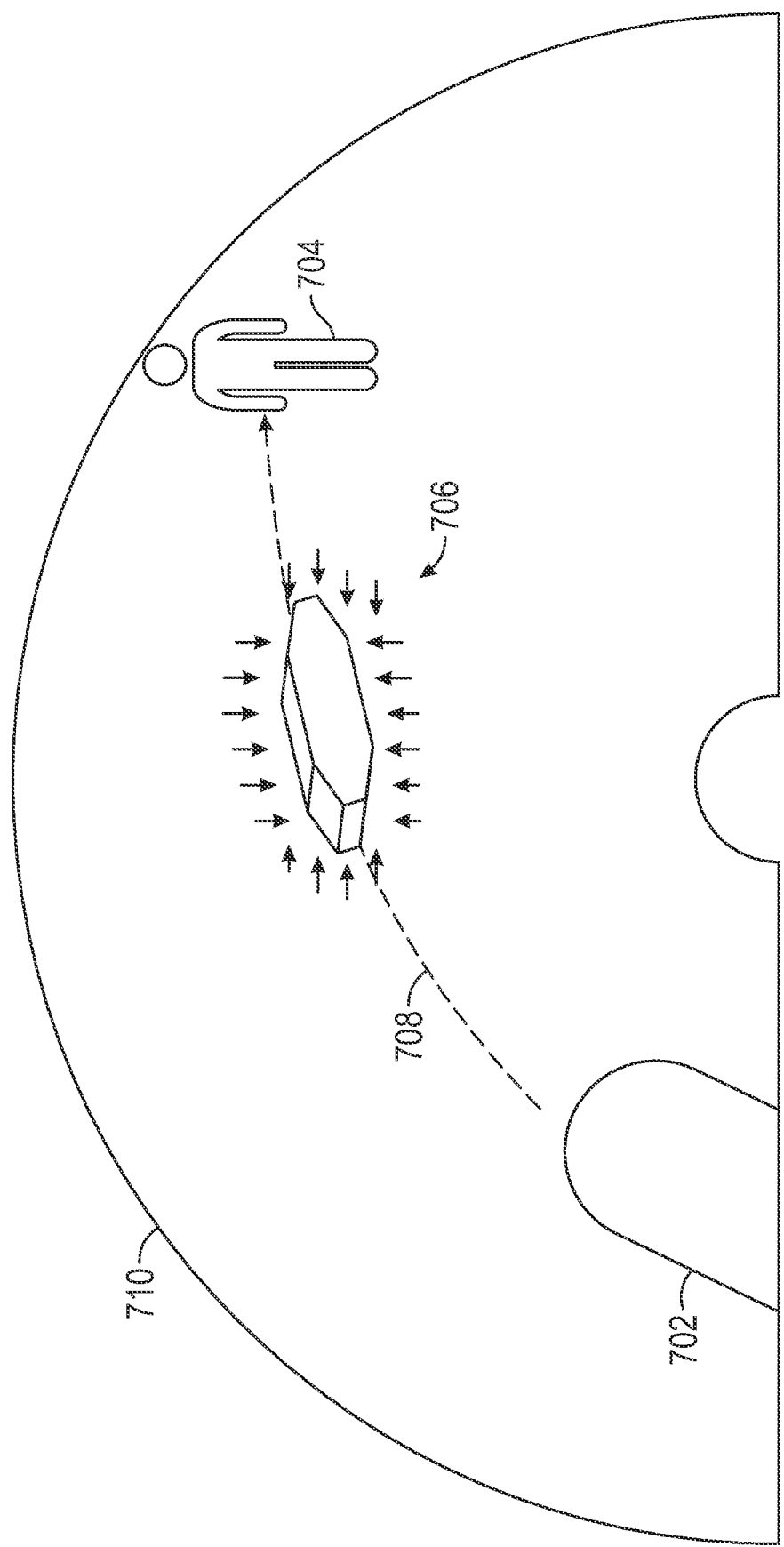

Referring to FIG. 7E, the virtual object may be displayed with reduced size and may be displayed as following movement of first avatar 702. As discussed above, displaying virtual object 706 as following movement of first avatar 702 may occur as a result of a first user associated with avatar 702 activating virtual object 706 in order to request a transfer of virtual object 706. In some embodiments, a user may activate the virtual object for reasons other than to initiate a request to transfer the virtual object, such as to take control of the virtual object and move to a new location with the virtual object. Referring to FIGS. 7E-7F, when a first user associated with avatar 702 activates virtual object 706 in order to initiate a request to transfer the virtual object 706, movement of virtual object may be displayed as moving away from first avatar 702 and towards second avatar 704. For example, virtual object 706 may already be displayed as having a reduced size when virtual object 706 is displayed as following movement of first avatar 702, such that when virtual object 706 is displayed as moving towards second avatar 704 along path 708, virtual object 706 is displayed as maintaining the reduced size.

Figure 7G:
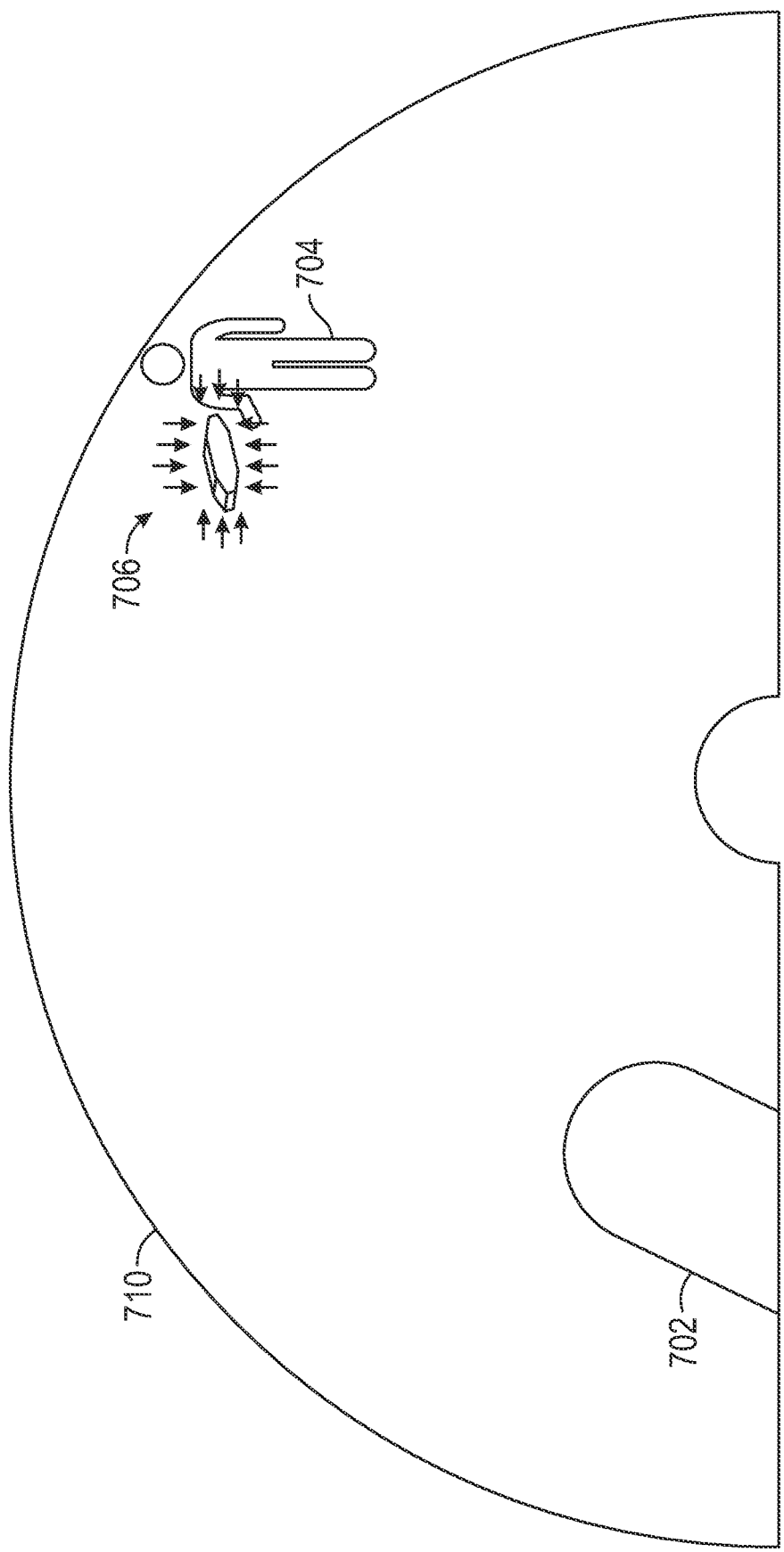

Referring to FIG. 7G, in response to displaying movement of the virtual object 706 away from the first avatar 702 and towards the second avatar 704, completion of the transfer of virtual object 706 from first avatar 702 to second avatar 704 may be depicted. For example, as shown in FIG. 7G, the virtual object 706 may be displayed as following movement of second avatar 704. In some embodiments, display of the virtual object 706 as following movement of second avatar 704 may include maintaining the display of the virtual object 706 with the reduction in size and displayed proximate to the second avatar 704. In some embodiments, completion of the transfer of virtual object 706 from first avatar 702 to second avatar 704 may include displaying an enlargement of the size of virtual object 706 to an original size. For example, an original size of the virtual object 706 may correspond to the displayed size of the virtual object 706 prior to displaying a reduction in the size of the virtual object 706, such as the size of virtual object 706 as depicted in FIG. 7A.

The embodiments discussed above with respect to FIGS. 2A-7G are exemplary and not intended to be limiting.

Figure 8:
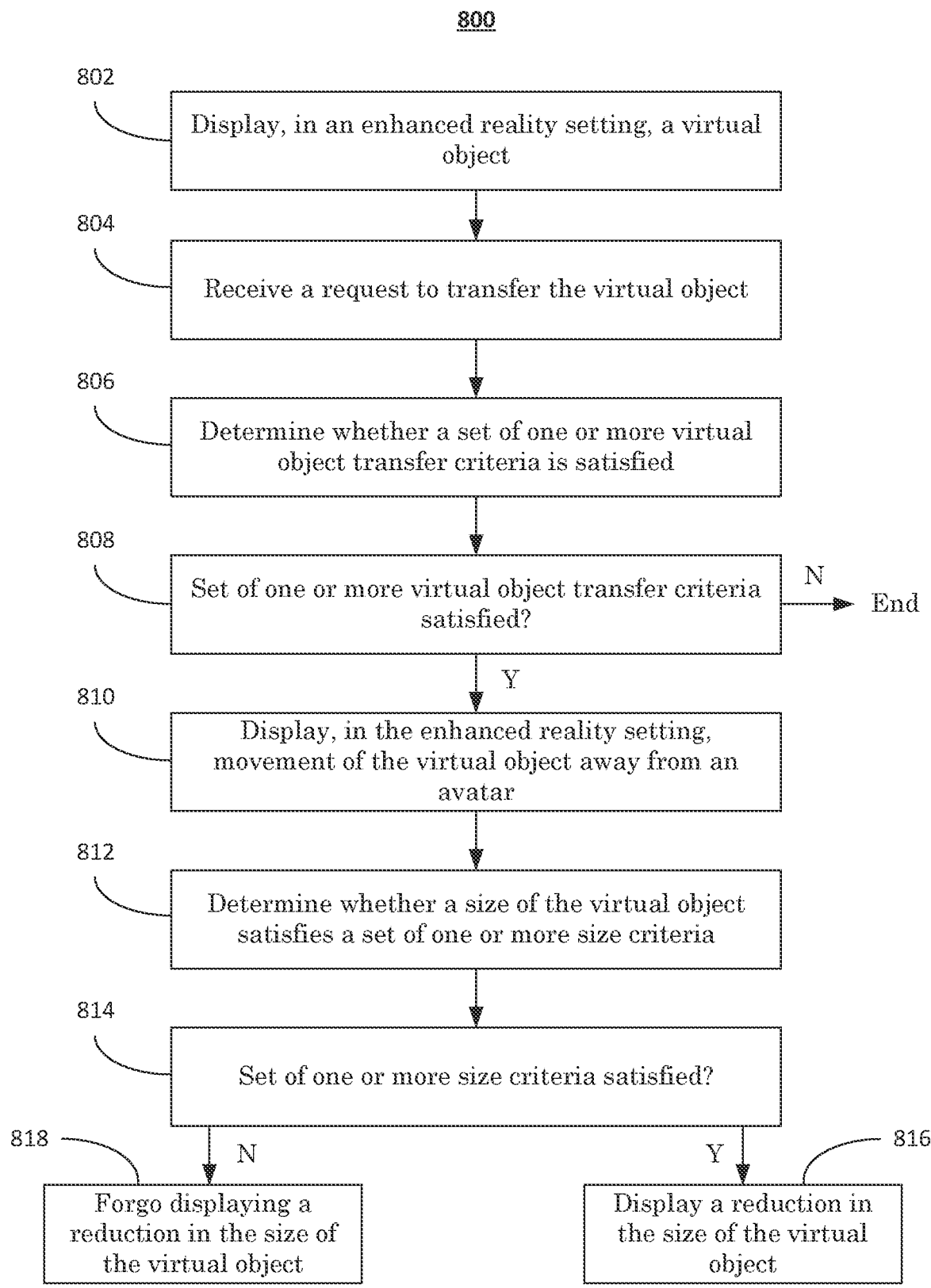
FIG. 8 depicts an exemplary process for transferring a virtual object in an enhanced reality setting according to an embodiment.

Referring to FIG. 8, a flow chart of an exemplary process 800 for transferring a virtual object with virtual object size reduction is depicted. Process 800 can be performed using a user device (e.g., device 100a). For example, the user device may be a handheld mobile device or a head-mounted device. In some embodiments, process 800 is performed using two or more electronic devices, such as a user device that is communicatively coupled to another device, such as a base device. Further, it should be appreciated that the display of the user device can be transparent or opaque. Process 800 can be applied, for example, to enhanced reality applications, such as virtual reality, augmented reality, or mixed reality applications and to effects that include visible features as well as non-visible features, such as audio, haptic, or the like. Although the blocks of process 800 are depicted in a particular order, it should be appreciated that these blocks can be performed in other orders. Furthermore, one or more blocks of process 800 can be optional and/or additional blocks may be performed.

At block 802, a virtual object is displayed in an enhanced reality setting. A request to transfer the virtual object is received at block 804. In some embodiments, receiving the request to transfer the virtual object includes determining that a gaze direction or gaze depth corresponds to the virtual object, and receiving an input representing user instruction to transfer the virtual object. In accordance with the request to transfer the virtual object at block 804, a determination is made at block 806 including determining whether a set of one or more virtual object transfer criteria is satisfied. In some embodiments, the request to transfer the virtual object at block 804 is initiated by a user associated with the avatar, wherein determining whether the set of one or more virtual object transfer criteria is satisfied at block 806 includes determining a first rank associated with the avatar and a second rank associated with a second avatar, determining whether the first rank is greater than the second rank, and in accordance with a determination that the first rank is greater than the second rank, determining that the set of one or more virtual object transfer criteria is satisfied. In some embodiments, the request to transfer the virtual object at block 804 is initiated by a user associated with a second avatar different from the avatar, wherein determining whether the set of one or more virtual object transfer criteria is satisfied at block 806 includes determining a first rank associated with the avatar and a second rank associated with the second avatar, determining whether the second rank is greater than the first rank, and in accordance with a determination that the second rank is greater than the first rank, determining that the set of one or more virtual object transfer criteria is satisfied.

In some embodiments, determining whether the set of one or more virtual object transfer criteria is satisfied at block 806 includes determining whether the request to transfer the virtual object is accepted by a user, wherein in accordance with a determination that the request to transfer the virtual object is accepted by a user, determining that the set of one or more virtual object transfer criteria is satisfied, and in accordance with a determination that the request to transfer the virtual object is not accepted by a user, determining that the set of one or more virtual object transfer criteria is not satisfied. In some embodiments, determining whether the set of one or more virtual object transfer criteria is satisfied at step 806 includes determining whether the request to transfer the virtual object is initiated by a user associated with a second avatar, wherein in accordance with a determination that the request to transfer the virtual object is initiated by a user associated with a second avatar, a determination is made whether the second avatar is permitted to receive the virtual object, and in accordance with a determination that the second avatar is permitted to receive the virtual object, a determination is made that the set of one or more virtual object transfer criteria is satisfied.

In some embodiments, in accordance with a determination that the set of one or more virtual object transfer criteria is not satisfied at step 808, an indication is displayed to indicate that transfer of the virtual object is rejected. In some embodiments, in accordance with a determination that the set of one or more virtual object transfer criteria is satisfied at block 808, movement of the virtual object away from an avatar is displayed in the enhanced reality setting at block 810. In some embodiments, displaying movement of the virtual object includes determining whether a size of the virtual object satisfies a set of one or more size criteria at block 812. In some embodiments, determining whether a size of the virtual object satisfies the set of one or more size criteria includes displaying a field of view of a virtual interface, wherein the field of view corresponds to a user associated with a second avatar, determining whether the virtual object obstructs the field of view beyond a threshold, and in accordance with a determination that the virtual object obstructs the field of view beyond the threshold, determining that the size of the virtual object satisfies the set of one or more size criteria.

In some embodiments, determining whether the virtual object obstructs the field of view beyond a threshold includes determining whether displaying movement of the virtual object causes obstruction of the field of view, and in accordance with a determination that displaying movement of the virtual object causes obstruction of the field of view, determining that the virtual object obstructs the field of view. In some embodiments, determining whether the virtual object obstructs the field of view beyond a threshold includes determining whether a percentage of the field of view is obstructed beyond a threshold percentage of the field of view, and in accordance with a determination that a percentage of the field of view is obstructed beyond the threshold percentage, determining that the virtual object obstructs the field of view. In some embodiments, determining whether the virtual object obstructs the field of view beyond a threshold includes determining whether a predefined area of the field of view is obstructed, and in accordance with a determination that a predefined area of the field of view is obstructed, determining that the virtual object obstructs the field of view.

In some embodiments, in accordance with a determination that the size of the virtual object satisfies the set of one or more size criteria at block 814, a reduction in the size of the virtual object is displayed at block 816. In some embodiments, displaying a reduction in the size of the virtual object includes reducing the size of the virtual object to a predetermined size, and displaying the reduction in the size of the virtual object based on the reduced size. In some embodiments, displaying a reduction in the size of the virtual object includes reducing the size of the virtual object to a predetermined percentage of the size, and displaying the reduction in the size of the virtual object based on the reduced size. In some embodiments, in accordance with a determination that the size of the virtual object does not satisfy the set of one or more size criteria at block 814, displaying a reduction in the size of the virtual object is displayed is foregone at block 818.

Executable instructions for performing the features of process 800 described above are, optionally, included in a transitory or non-transitory computer-readable storage medium or other computer program product configured for execution by one or more processors.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The foregoing descriptions of specific embodiments are presented for purposes of illustration and description. They are not intended to be exhaustive or to limit the scope of the claims to the precise forms disclosed, and it should be understood that many modifications and variations are possible in light of the above descriptions.

What is claimed is:

1. An electronic device, comprising:
   one or more processors; and
   memory storing one or more programs configured to be executed by the one or more processors, the one or more programs including instructions for:
   displaying, in an enhanced reality setting, a virtual object;
   receiving a request to transfer the virtual object;
   in accordance with the request, determining whether a set of one or more virtual object transfer criteria is satisfied; and
   in accordance with a determination that the set of one or more virtual object transfer criteria is satisfied:
   displaying, in the enhanced reality setting, movement of the virtual object away from an avatar, wherein displaying movement of the virtual object comprises:
   determining whether a perceived size of the virtual object satisfies a set of one or more size criteria;
   in accordance with a determination that the perceived size of the virtual object satisfies the set of one or more size criteria, displaying a reduction in the perceived size of the virtual object; and
   in accordance with a determination that the perceived size of the virtual object does not satisfy the set of one or more size criteria, forgoing displaying a reduction in the perceived size of the virtual object.

2. The electronic device of claim 1, wherein the request to transfer the virtual object is initiated by a user associated with the avatar.

3. The electronic device of claim 2, wherein determining whether the set of one or more virtual object transfer criteria is satisfied comprises:
   determining a first rank associated with the avatar and a second rank associated with a second avatar;
   determining whether the first rank is greater than the second rank; and
   in accordance with a determination that the first rank is greater than the second rank, determining that the set of one or more virtual object transfer criteria is satisfied.

4. The electronic device of claim 1, wherein the request to transfer the virtual object is initiated by a user associated with a second avatar different from the avatar.

5. The electronic device of claim 4, wherein determining whether the set of one or more virtual object transfer criteria is satisfied comprises:
   determining a first rank associated with the avatar and a second rank associated with the second avatar;
   determining whether the second rank is greater than the first rank; and
   in accordance with a determination that the second rank is greater than the first rank, determining that the set of one or more virtual object transfer criteria is satisfied.

6. The electronic device of claim 1, wherein determining whether the set of one or more virtual object transfer criteria is satisfied comprises:
   determining whether the request to transfer the virtual object is accepted by a user;
   in accordance with a determination that the request to transfer the virtual object is accepted by the user, determining that the set of one or more virtual object transfer criteria is satisfied; and
   in accordance with a determination that the request to transfer the virtual object is not accepted by the user, determining that the set of one or more virtual object transfer criteria is not satisfied.

7. The electronic device of claim 1, wherein determining whether the set of one or more virtual object transfer criteria is satisfied comprises:
   determining whether the request to transfer the virtual object is initiated by a user associated with a second avatar;
   in accordance with a determination that the request to transfer the virtual object is initiated by the user associated with the second avatar, determining whether the second avatar is permitted to receive the virtual object; and
   in accordance with a determination that the second avatar is permitted to receive the virtual object, determining that the set of one or more virtual object transfer criteria is satisfied.

8. The electronic device of claim 1, wherein determining whether the perceived size of the virtual object satisfies the set of one or more size criteria comprises:
   displaying a field of view of a virtual interface, wherein the field of view corresponds to a user associated with a second avatar;
   determining whether the virtual object obstructs the field of view beyond a threshold; and
   in accordance with a determination that the virtual object obstructs the field of view beyond the threshold, determining that the perceived size of the virtual object satisfies the set of one or more size criteria.

9. The electronic device of claim 8, wherein determining whether the virtual object obstructs the field of view beyond the threshold comprises:
   determining whether displaying movement of the virtual object causes obstruction of the field of view; and
   in accordance with a determination that displaying movement of the virtual object causes obstruction of the field of view, determining that the virtual object obstructs the field of view.

10. The electronic device of claim 8, wherein determining whether the virtual object obstructs the field of view beyond the threshold comprises:
    determining whether a percentage of the field of view is obstructed beyond a threshold percentage of the field of view; and
    in accordance with a determination that the percentage of the field of view is obstructed beyond the threshold percentage, determining that the virtual object obstructs the field of view.

11. The electronic device of claim 8, wherein determining whether the virtual object obstructs the field of view beyond the threshold comprises:
    determining whether a predefined area of the field of view is obstructed; and
    in accordance with a determination that the predefined area of the field of view is obstructed, determining that the virtual object obstructs the field of view.

12. The electronic device of claim 1, wherein displaying the reduction in the perceived size of the virtual object comprises:
    reducing the perceived size of the virtual object to a predetermined perceived size; and
    displaying the reduction in the perceived size of the virtual object based on the reduced perceived size.

13. The electronic device of claim 1, wherein displaying the reduction in the perceived size of the virtual object comprises:
reducing the perceived size of the virtual object to a predetermined percentage of the perceived size; and
displaying the reduction in the perceived size of the virtual object based on the reduced perceived size.

14. The electronic device of claim 1, the one or more programs further including instructions for:
in accordance with a determination that the set of one or more virtual object transfer criteria is not satisfied:
displaying an indication that transfer of the virtual object is rejected.

15. The electronic device of claim 1, wherein receiving the request to transfer the virtual object comprises:
determining that a gaze direction or gaze depth corresponds to the virtual object; and
receiving an input representing user instruction to transfer the virtual object.

16. A non-transitory computer-readable storage medium storing one or more programs configured to be executed by one or more processors of an electronic device, the one or more programs including instructions for:
displaying, in an enhanced reality setting, a virtual object;
receiving a request to transfer the virtual object;
in accordance with the request, determining whether a set of one or more virtual object transfer criteria is satisfied; and
in accordance with a determination that the set of one or more virtual object transfer criteria is satisfied:
displaying, in the enhanced reality setting, movement of the virtual object away from an avatar, wherein displaying movement of the virtual object comprises:
determining whether a perceived size of the virtual object satisfies a set of one or more size criteria;
in accordance with a determination that the perceived size of the virtual object satisfies the set of one or more size criteria, displaying a reduction in the perceived size of the virtual object; and
in accordance with a determination that the perceived size of the virtual object does not satisfy the set of one or more size criteria, forgoing displaying a reduction in the perceived size of the virtual object.

17. The non-transitory computer-readable storage medium of claim 16, wherein the request to transfer the virtual object is initiated by a user associated with the avatar.

18. The non-transitory computer-readable storage medium of claim 16, wherein the request to transfer the virtual object is initiated by a user associated with a second avatar different from the avatar.

19. The non-transitory computer-readable storage medium of claim 16, wherein determining whether the set of one or more virtual object transfer criteria is satisfied comprises:
determining whether the request to transfer the virtual object is accepted by a user;
in accordance with a determination that the request to transfer the virtual object is accepted by the user, determining that the set of one or more virtual object transfer criteria is satisfied; and
in accordance with a determination that the request to transfer the virtual object is not accepted by the user, determining that the set of one or more virtual object transfer criteria is not satisfied.

20. The non-transitory computer-readable storage medium of claim 16, wherein determining whether the perceived size of the virtual object satisfies the set of one or more size criteria comprises:
displaying a field of view of a virtual interface, wherein the field of view corresponds to a user associated with a second avatar;
determining whether the virtual object obstructs the field of view beyond a threshold; and
in accordance with a determination that the virtual object obstructs the field of view beyond the threshold, determining that the perceived size of the virtual object satisfies the set of one or more size criteria.

21. The non-transitory computer-readable storage medium of claim 16, wherein receiving the request to transfer the virtual object comprises:
determining that a gaze direction or gaze depth corresponds to the virtual object; and
receiving an input representing user instruction to transfer the virtual object.

22. A method comprising:
displaying, in an enhanced reality setting, a virtual object;
receiving a request to transfer the virtual object;
in accordance with the request, determining whether a set of one or more virtual object transfer criteria is satisfied; and
in accordance with a determination that the set of one or more virtual object transfer criteria is satisfied:
displaying, in the enhanced reality setting, movement of the virtual object away from an avatar, wherein displaying movement of the virtual object comprises:
determining whether a perceived size of the virtual object satisfies a set of one or more size criteria;
in accordance with a determination that the perceived size of the virtual object satisfies the set of one or more size criteria, displaying a reduction in the perceived size of the virtual object; and
in accordance with a determination that the perceived size of the virtual object does not satisfy the set of one or more size criteria, forgoing displaying a reduction in the perceived size of the virtual object.

23. The method of claim 22, wherein the request to transfer the virtual object is initiated by a user associated with the avatar.

24. The method of claim 22, wherein the request to transfer the virtual object is initiated by a user associated with a second avatar different from the avatar.

25. The method of claim 22, wherein determining whether the set of one or more virtual object transfer criteria is satisfied comprises:
determining whether the request to transfer the virtual object is accepted by a user;
in accordance with a determination that the request to transfer the virtual object is accepted by the user, determining that the set of one or more virtual object transfer criteria is satisfied; and
in accordance with a determination that the request to transfer the virtual object is not accepted by the user, determining that the set of one or more virtual object transfer criteria is not satisfied.

* * * * *